(12) United States Patent
Dabrowski

(10) Patent No.: US 11,495,087 B2
(45) Date of Patent: *Nov. 8, 2022

(54) METHOD AND APPARATUS FOR PROVIDING SECURE AND ANONYMOUS CASH-OUT AND CASH-IN VALUES IN A GAMING SYSTEM

(71) Applicant: Stanley P. Dabrowski, Las Vegas, NV (US)

(72) Inventor: Stanley P. Dabrowski, Las Vegas, NV (US)

(*) Notice: Subject to any disclaimer, the term of this patent is extended or adjusted under 35 U.S.C. 154(b) by 65 days.

This patent is subject to a terminal disclaimer.

(21) Appl. No.: 15/888,814

(22) Filed: Feb. 5, 2018

(65) Prior Publication Data

US 2018/0158278 A1    Jun. 7, 2018

Related U.S. Application Data

(63) Continuation-in-part of application No. 15/467,951, filed on Mar. 23, 2017, now Pat. No. 10,909,798, which is a continuation-in-part of application No. 15/139,227, filed on Apr. 26, 2016, now Pat. No. 10,475,280, which is a continuation-in-part of application No. 14/715,405, filed on May 18, 2015, now Pat. No. 9,367,992, and a continuation-in-part of application No. 29/518,511, filed on Feb. 24, 2015, (Continued)

(51) Int. Cl.
G07F 17/32       (2006.01)
G06Q 20/40       (2012.01)
G06V 40/13       (2022.01)

(52) U.S. Cl.
CPC ......... *G07F 17/3241* (2013.01); *G06Q 20/40* (2013.01); *G06V 40/13* (2022.01); *G07F 17/32* (2013.01); *G07F 17/3206* (2013.01); *G07F 17/3244* (2013.01); *G07F 17/3246* (2013.01)

(58) Field of Classification Search
CPC .. G07F 17/32; G07F 17/3241; G07F 17/3206; G07F 17/3244; G07F 17/3246; G06K 9/00013; G06Q 20/40; G06V 40/13
USPC ........................................... 463/25
See application file for complete search history.

(56) References Cited

U.S. PATENT DOCUMENTS

D41,921 S    11/1911  Huff
1,691,923 A  11/1928  Eklund
(Continued)

FOREIGN PATENT DOCUMENTS

WO    1994016781    8/1994
WO    1998059311    12/1998
(Continued)

OTHER PUBLICATIONS

Final Office Action dated Sep. 24, 2018 for U.S. Appl. No. 15/139,227.
(Continued)

*Primary Examiner* — Peter S Vasat
*Assistant Examiner* — Wei Lee
(74) *Attorney, Agent, or Firm* — Gates & Cooper LLP

(57) ABSTRACT

A method, apparatus, article of manufacture, and a memory structure for transferring a monetary value from a first gaming station to a second gaming station by use of biometric data are disclosed. Each station includes a biometric sensor that provides biometric data that is used in the transfer of the payout.

11 Claims, 28 Drawing Sheets

Related U.S. Application Data now Pat. No. Des. 756,819, said application No. 14/715,405 is a continuation of application No. 14/486,920, filed on Sep. 15, 2014, now Pat. No. 9,033,794, which is a continuation of application No. 11/386,341, filed on Mar. 22, 2006, now Pat. No. 8,834,264.

(56) References Cited

U.S. PATENT DOCUMENTS

| | | | |
|---|---|---|---|
| 4,880,237 A | 11/1989 | Kishishita | |
| 5,179,517 A | 1/1993 | Sarbin et al. | |
| 5,239,165 A | 8/1993 | Novak | |
| 5,251,738 A | 10/1993 | Dabrowski | |
| 5,265,874 A | 11/1993 | Dickinson et al. | |
| 5,290,033 A | 3/1994 | Bittner et al. | |
| 5,371,345 A | 12/1994 | LeStrange et al. | |
| 5,420,406 A | 5/1995 | Izawa et al. | |
| 5,470,079 A | 11/1995 | Heng et al. | |
| 5,544,728 A | 8/1996 | Dabrowski | |
| 5,557,086 A | 9/1996 | Schulze et al. | |
| 5,577,959 A | 11/1996 | Takemoto | |
| 5,580,311 A | 12/1996 | Haste, III | |
| 5,595,538 A | 1/1997 | Haste, III | |
| 5,709,603 A | 1/1998 | Kaye | |
| 5,764,789 A | 6/1998 | Pare et al. | |
| 5,772,510 A | 6/1998 | Roberts | |
| 5,791,990 A | 8/1998 | Schroeder et al. | |
| 5,818,026 A | 10/1998 | Melling et al. | |
| 5,915,588 A | 6/1999 | Stoken et al. | |
| 6,012,832 A | 1/2000 | Saunders et al. | |
| 6,014,594 A | 1/2000 | Heidel et al. | |
| 6,048,269 A | 4/2000 | Burns et al. | |
| 6,056,289 A | 5/2000 | Clapper, Jr. | |
| 6,110,044 A | 8/2000 | Stern | |
| 6,113,492 A | 9/2000 | Walker et al. | |
| D431,481 S | 10/2000 | Bruhn | |
| 6,128,550 A | 10/2000 | Heidel et al. | |
| 6,170,744 B1 | 1/2001 | Lee et al. | |
| 6,253,119 B1 | 6/2001 | Dabrowski | |
| 6,263,258 B1 | 7/2001 | Dabrowski | |
| 6,280,326 B1 | 8/2001 | Saunders | |
| 6,340,331 B1 | 1/2002 | Saunders et al. | |
| 6,471,590 B2 | 10/2002 | Saunders | |
| 6,547,664 B2 | 4/2003 | Saunders | |
| 6,558,256 B1 | 5/2003 | Saunders | |
| 6,612,928 B1* | 9/2003 | Bradford | G06F 21/31 463/29 |
| 6,623,357 B2 | 9/2003 | Chowdhury | |
| 6,650,427 B2 | 11/2003 | Brooks et al. | |
| 6,709,333 B1* | 3/2004 | Bradford | G07F 17/32 463/29 |
| 6,763,998 B1 | 7/2004 | Miodunski et al. | |
| 7,107,245 B1 | 9/2006 | Kowalick | |
| 7,125,335 B2 | 10/2006 | Rowe | |
| 7,147,558 B2 | 12/2006 | Giobbi | |
| 7,324,973 B2 | 1/2008 | Taylor, III | |
| D580,737 S | 11/2008 | Singtoroj | |
| 7,620,818 B2* | 11/2009 | Vetro | H04L 9/0866 713/186 |
| 7,867,083 B2 | 1/2011 | Wells et al. | |
| 7,871,329 B2 | 1/2011 | Rowe | |
| 7,979,740 B2 | 7/2011 | Taylor et al. | |
| 8,159,328 B2 | 4/2012 | Luckhardt | |
| 8,243,929 B2 | 8/2012 | Wells et al. | |
| 8,510,567 B2 | 8/2013 | Alderucci et al. | |
| 9,280,648 B2 | 3/2016 | Alderucci et al. | |
| 9,619,965 B1 | 4/2017 | Hill | |
| 10,909,798 B2* | 2/2021 | Dabrowski | G07F 17/3244 |
| 2002/0142844 A1 | 10/2002 | Kerr | |
| 2002/0160832 A1 | 10/2002 | Burns et al. | |
| 2002/0160834 A1 | 10/2002 | Urie et al. | |
| 2003/0092489 A1 | 5/2003 | Veradej | |
| 2003/0131265 A1 | 7/2003 | Bhakta | |
| 2003/0166412 A1 | 9/2003 | Marcu | |
| 2003/0171145 A1 | 9/2003 | Rowe | |
| 2005/0159214 A1 | 7/2005 | Rohde et al. | |
| 2006/0046842 A1 | 3/2006 | Mattice et al. | |
| 2006/0205497 A1 | 9/2006 | Wells et al. | |
| 2007/0167220 A1* | 7/2007 | Fujimoto | G07F 17/32 463/25 |
| 2008/0113785 A1 | 5/2008 | Alderucci et al. | |
| 2008/0113786 A1 | 5/2008 | Alderucci et al. | |
| 2008/0113787 A1 | 5/2008 | Alderucci et al. | |
| 2009/0124376 A1 | 5/2009 | Kelly et al. | |
| 2009/0176565 A1 | 7/2009 | Kelly | |
| 2009/0176566 A1* | 7/2009 | Kelly | G07F 17/32 463/29 |
| 2009/0325708 A9 | 12/2009 | Kerr | |
| 2013/0072295 A1 | 3/2013 | Alderucci et al. | |
| 2013/0137516 A1 | 5/2013 | Griswold et al. | |
| 2014/0279858 A1 | 9/2014 | Stephanson | |

FOREIGN PATENT DOCUMENTS

| | | |
|---|---|---|
| WO | 1999022350 | 5/1999 |
| WO | 2001082176 | 11/2001 |

OTHER PUBLICATIONS

Non-Final Office Action dated May 2, 2019 for U.S. Appl. No. 15/139,227.
Non-Final Office Action dated Apr. 5, 2019 for U.S. Appl. No. 15/467,951.
Notice of Allowance dated Aug. 14, 2019 for U.S. Appl. No. 15/139,227.
Final Office Action dated Apr. 6, 2020 for U.S. Appl. No. 15/467,951.
Notice of Allowance dated Sep. 22, 2020 for U.S. Appl. No. 15/467,951.

* cited by examiner

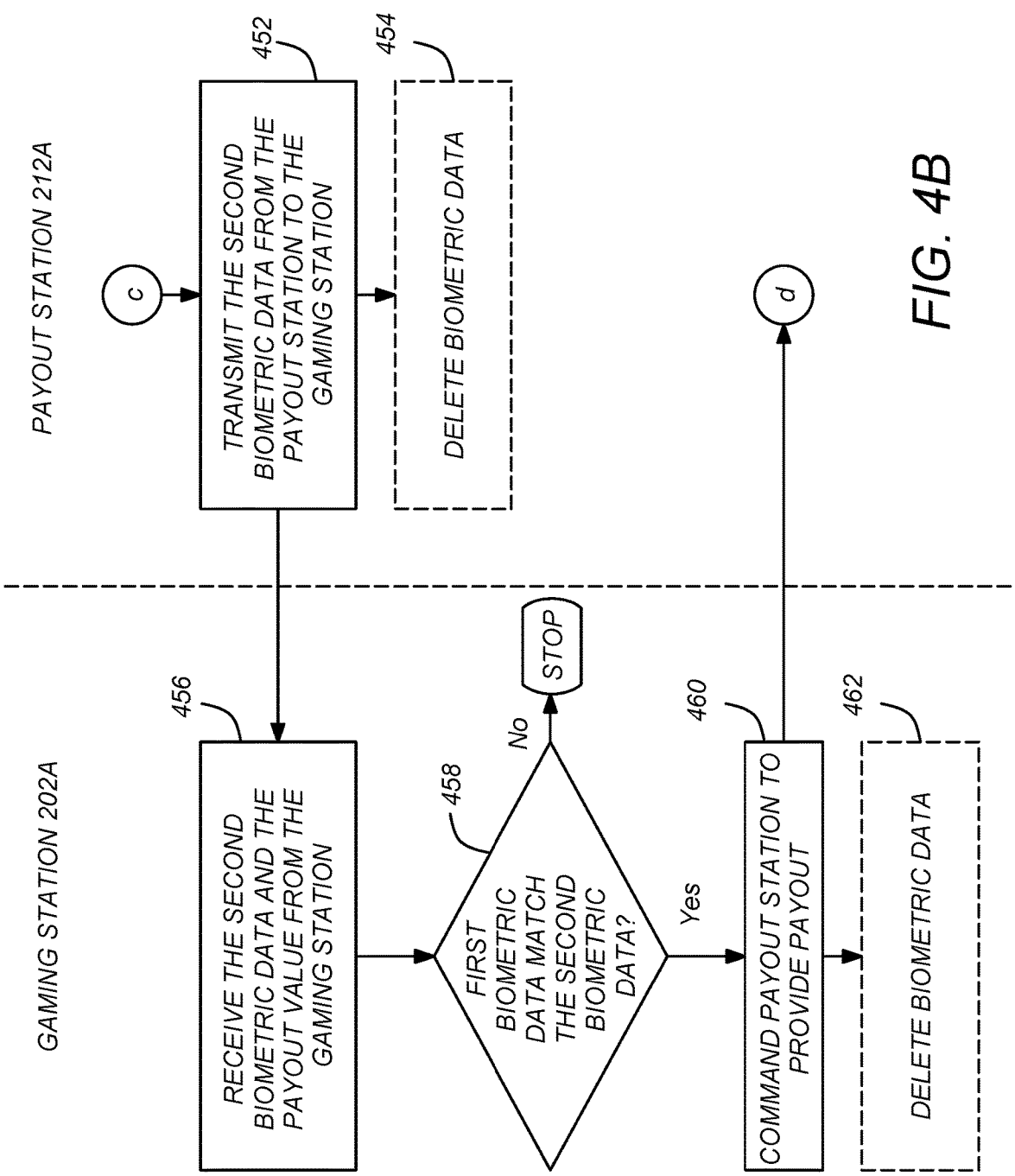

METHOD AND APPARATUS FOR PROVIDING SECURE AND ANONYMOUS CASH-OUT AND CASH-IN VALUES IN A GAMING SYSTEM

CROSS-REFERENCE TO RELATED APPLICATIONS

This application is a continuation-in-part of U.S. patent application Ser. No. 15/467,951, entitled "METHOD AND APPARATUS FOR PROVIDING SECURE AND ANONYMOUS CASH-OUT AND CASH-IN VALUES IN A GAMING SYSTEM," by Stanley P. Dabrowski, filed Mar. 23, 2017, which application is a continuation in part of U.S. patent application Ser. No. 15/139,227, entitled "METHOD AND APPARATUS FOR PROVIDING SECURE AND ANONYMOUS CASH-OUT AND CASH-IN VALUES IN A GAMING SYSTEM," by Stanley P. Dabrowski, filed Apr. 26, 2016, hereby incorporated by reference herein and which is a continuation-in part of the following U.S. Patent Applications, all of which applications are also hereby incorporated by reference herein:

U.S. Design patent application Ser. No. 29/518,511, entitled "PERSONAL BIOMETRIC IDENTIFICATION SENSOR DEVICE," by Stanley P. Dabrowski, filed Feb. 24, 2015, issued as U.S. Design Pat. No. D756,819 on May 24, 2016;

U.S. patent application Ser. No. 14/715,405, entitled "METHOD AND APPARATUS FOR PROVIDING SECURE AND ANONYMOUS CASH-OUT AND CASH-IN VALUES IN A GAMING SYSTEM," by Stanley P. Dabrowski, filed May 18, 2015, issued as U.S. Pat. No. 9,367,992 on Jun. 14, 2016, which application is a continuation of U.S. patent application Ser. No. 14/486,920, entitled METHOD AND APPARATUS FOR PROVIDING SECURE AND ANONYMOUS CASH-OUT AND CASH-IN VALUES IN A GAMING SYSTEM," by Stanley P. Dabrowski, filed Sep. 15, 2014, issued as U.S. Pat. No. 9,033,794 on May 19, 2015, which is a continuation of U.S. patent application Ser. No. 11/386,341, entitled "METHOD AND APPARATUS FOR PROVIDING CASH-OUT AND CASH-IN VALUES TO A GAMING DEVICE," by Stanley P. Dabrowski, filed Mar. 22, 2006, issued as U.S. Pat. No. 8,834,264 on Sep. 16, 2014, all of which applications are also incorporated by reference herein.

BACKGROUND OF THE INVENTION

1. Field of the Invention

The present invention relates to systems and methods for managing currency transactions in gaming environments, and in particular, to an inexpensive system for securely cashing in and out of a gaming device.

2. Description of the Related Art

Recent years have seen the expansion of the gaming industry. One of the problems associated with both traditional (e.g. casino) and non-traditional environments (e.g. bars, gas stations, restaurants, and convenience stores) involves the management of currency transactions between players and the management of the non-traditional environment.

Traditional gaming devices accepted coins and paid out winnings in coin. Many of these devices were later replaced by gaming machines that accept both bills and coins, and issue payouts in coins. Many gaming establishments later turned to cashless gaming systems. In such systems, when the player cashes out, the gaming device issues a printed token with a manifestation of the cash-out value. The token can be inserted into another gaming device to continue play, or into a redemption machine to receive cash payment for the cash-out value.

However, such gaming devices with token printers/dispensers are not inexpensive to purchase and maintain (printers consume paper and systems with pre-printed tokens (such as is illustrated in U.S. Pat. No. 6,598,788, hereby incorporated by reference) need to be periodically replenished with pre-printed tokens. They are also prone to failure, and since the printed result itself has monetary value, such failures can require considerable attention on the part of the attendant to resolve. These responsibilities may detract from the attendant's other duties, and raises the possibility of possible cooperative fraud involving a player and the attendant. The use of tokens such as barcoded tickets on table games (e.g. games such as blackjack, craps, roulette and baccarat, which are played on a table and operated by one or more live dealers such as a croupier or poker dealer) are also impractical due to the size of the associated equipment.

Printed tokens may also be lost or misplaced, and in some cases, are not negotiable at all locations within the casino. For example, the player may desire to cash out of a video poker machine and apply the payout credits to purchase a meal at a restaurant in the casino.

For a variety of reasons, it is also beneficial to permit tracking of players and other customers as they partake in various services throughout the casino. For example, a person may enter a casino and begin playing a gaming machine, and upon a public announcement indicating the beginning of a lounge show or restaurant special, it is useful to know how many persons within the casino cashed out of their games and later used those credits to attend the lounge show or enter the restaurant for a meal.

These advantages extend not only to gaming machines, table games, restaurants, vending machines, and virtually any vending or service activity within the casino.

Hence, what is needed is a payout system that provides secure cash-out payments in a way that is sufficiently economical and convenient for use in both traditional and non-traditional gaming operations. What is also needed is for that system to permit credits to be transferred from virtually any service/vending entity in the casino, and if desired, related financial institutions. The present invention satisfies that need.

SUMMARY OF THE INVENTION

To address the requirements described above, the present invention discloses a method, system and apparatus for transferring monetary value. In one embodiment, the method comprises accepting a first command in a first station, the first command associated with a first monetary value, sensing a biometric of a person with a first biometric sensor at the first station, generating first biometric data from the biometric sensed by the first biometric sensor, accepting a second command at a second station, sensing the biometric of the person with a second biometric sensor at the second station, generating second biometric data from the biometric sensed by the second biometric sensor, after accepting the second command in the second station, comparing the first biometric data with the second biometric data, and crediting the second station with at least a portion of the first monetary value based at least in part upon the comparison of first biometric data and the second biometric data. In one embodiment, the first command is accepted via a first input device having the first biometric sensor, the first biometric sensor concurrently sensing the biometric of the person when accepting the first command.

In another embodiment, the apparatus is evidenced by a system for transferring monetary value. The system comprises a first station and a second station. The first station has a first input device having a first biometric sensor, for accepting a first command in the first station while concurrently sensing a biometric of a person, and a first processor, communicatively coupled to the first input device and a memory storing first processor instructions comprising first processor instructions for accepting the first command in the first station, the first command associated with a first monetary value, and generating first biometric data from the biometric sensed by the first biometric sensor. The second station comprises a second input device having a second biometric sensor for accepting a second command in the second station while concurrently sensing the biometric of the person and a second processor, communicatively coupled to the second input device and a memory storing second processor instructions, comprising second processor instructions for accepting a second command in the first station, and generating second biometric data from the biometric sensed by the second biometric sensor. In one embodiment, the first biometric data is compared with the second biometric data after the second command is accepted in the second station and the second station credits the second station with at least a portion of the first monetary value based at least in part upon a comparison of the first biometric data and the second biometric data.

Another embodiment is evidenced by a gaming station, comprising a processor, communicatively coupled to a memory, a user interface having a display, communicatively coupled to the processor, an integrated input device, communicatively coupled to the processor. The integrated input device comprises a switch actuated by touch or motion initiated by an appendage of a user having a biometric on a surface of the switch, and a biometric sensor, disposed proximate the surface of the switch, for measuring the biometric when the switch is actuated by the user. The memory comprises processor instructions for determining if the switch is actuated by the user, and if the switch is actuated by the user, measuring the biometric using the biometric sensor, associating a monetary value of the gaming station with the biometric.

The systems described above offer many advantages over the prior art. First, the use of personal biometrics does not require the user to carry tokens that cost money to create and may be lost or misplaced, and offer transfer of funds in a manner that is secure to the individual, rather than to the possessor of the token. Second, unlike other systems that use biometrics to verify identity in monetary transactions (e.g. ATM machines and smartphones), the systems described above do not require the enrollment of participants in the system. Hence, to simply transfer monetary value from one station to another does not require knowledge of the identity of the participant, but only that the same participant wishes to transfer monetary value from one station to another. Hence, the participant's biometric need only be stored for a sufficient period of time to permit such transfer and need never be associated with the identity of the participant. The use of such anonymous biometric data alleviates participant's concerns that their biometric data might be compromised or used for purposes other than transferring monetary funds from one station to another, particularly in embodiments in which the participant's biometric data is encrypted using other biometric data from the same participant. Third, they allow (but do not require) the use of locally available RTD or ATM (or ATM-like device) to cash in or out of a gaming machine. ATMs typically store relatively large sums of money, and the infrastructure for maintaining those stores of cash within acceptable limits are already in place. In addition, when using ATMs to access personal savings accounts, users are less apprehensive about providing their biometric, since it further secures their account from unauthorized access. These embodiments of the present invention take advantage of the ATMs large cash supply, existing maintenance infrastructure, user interface, and security devices to allow users to securely cash in and out of a gaming device.

The systems and methods also advantageously allow the user to use a smartphone having a biometric sensor to cash in or cash out of gaming devices and transaction stations within the casino. Further, the biometric data can be used to safely transfer other credits of monetary value and to track players within the casino, and at other participating facilities.

BRIEF DESCRIPTION OF THE DRAWINGS

Referring now to the drawings in which like reference numbers represent corresponding parts throughout:

FIGS. 4A and 4B are flow charts illustrating techniques for sharing fingerprint data for cash-out purposes;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
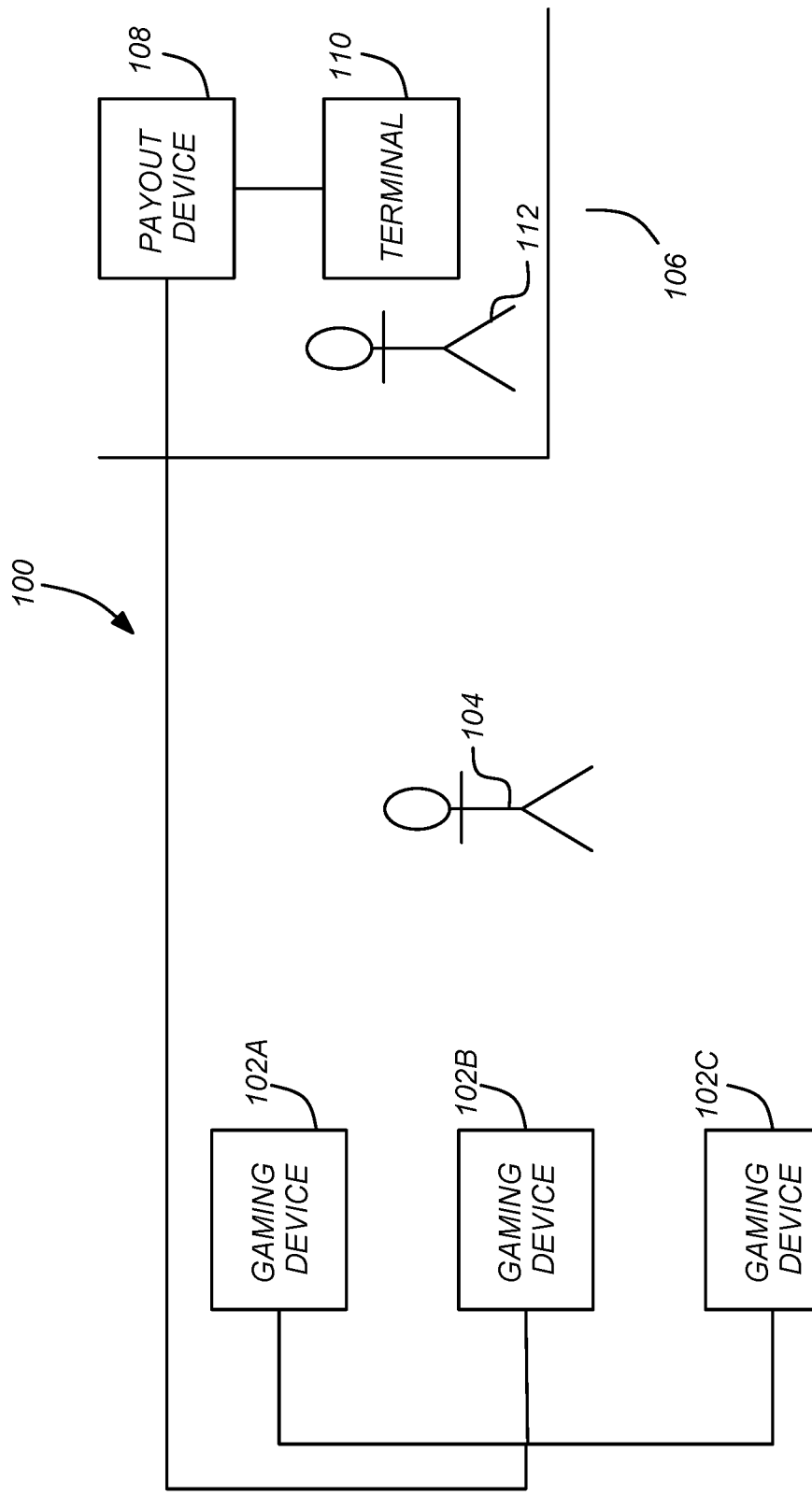
FIG. 1 is a diagram illustrating an exemplary prior art gaming system.

FIG. 1 is a diagram illustrating an exemplary prior art gaming system 100 that might be located in a remote location such as a convenience store or a saloon. The gaming system 100 comprises one or more gaming devices 102A-102C (hereinafter alternatively referred to as gaming device(s) 102). Each of the gaming devices is communicatively coupled to a remote payout device 108 communicatively coupled to a terminal 110. Under control of the terminal 110, the remote payout device 108 dispenses the player's 104 payout. Typically, the terminal 110 and payout device 108 are not available to the player 104 to receive the payout, as illustrated by barrier 106. Instead, the attendant 112 acts as an intermediary between the player 104 and the payout dispensed by the payout device 108. An example of a prior art gaming system 100 is the system disclosed in U.S. Pat. No. 6,763,998, issued to Miodunski et al., which application is hereby incorporated by reference herein.

Figure 2:
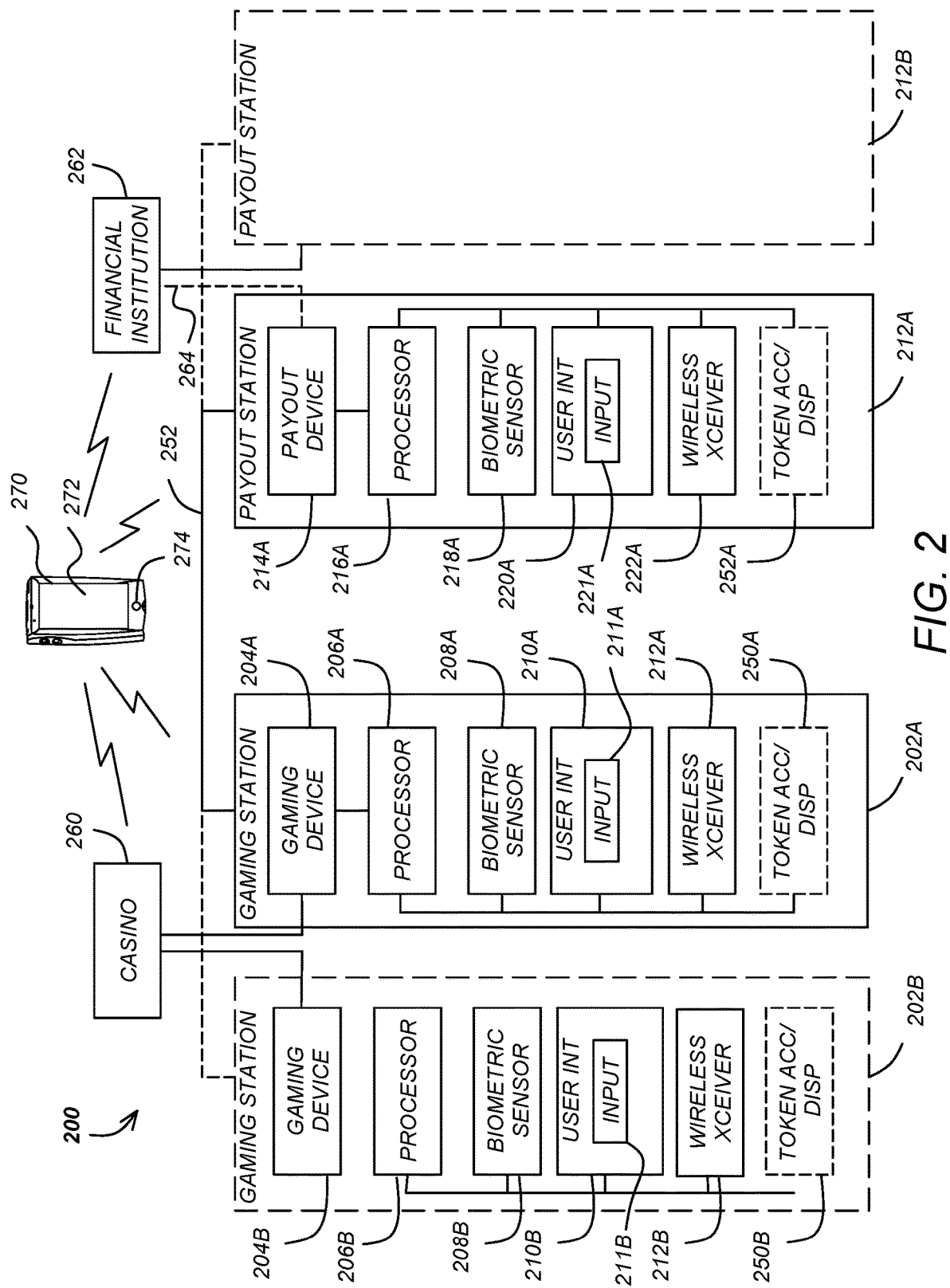
FIG. 2 is a diagram showing an embodiment of a gaming machine payout system.

FIG. 2 is a diagram showing an embodiment of a gaming machine payout system (GMPS) 200. The GMPS 200 comprises one or more gaming stations 202A, 202B (hereinafter, alternatively referred to as gaming station(s) 202), and one or more transaction stations such as payout station(s) 212A, 212B (hereinafter, alternatively referred to as transaction or payout station(s) 212). In one embodiment of the GMPS 200, the gaming station(s) 202 are communicatively coupled to the payout station(s) 212 via communication medium 252. In this context, the term "communicatively coupled" indicates that the gaming stations and payout stations are configured to be in substantially instantaneous communication with one another. Hence, the communication medium 252 may comprise one or more wires, a wireless link such as infrared (IR) or radio frequency (RF), or a computer network.

Each gaming station 202A, 202B may comprise a gaming device 204A, 204B such as a video poker machine or a slot machine. The gaming device 204A, 204B typically includes its own processor, display, cash and/or coin acceptance device, and payout device. In one embodiment, the gaming device 204A, 204B is a conventional gaming device that has been modified as described in U.S. Pat. No. 6,379,246, which is hereby incorporated by reference.

The gaming stations 202A, 202B further comprise a processor 206A, 206B, a biometric sensor 208A, 208B (such as fingerprint sensor), a user interface 210A, 210B and an optional token acceptor/dispenser 250A, 250B. The processor 206A, 206B is communicatively coupled to accept data from the biometric sensor 208A, 208B, to accept input from and/or provide output to the user interface 210A, 210B, and to control the token acceptor/dispenser 250A, 250B. Typically, the processor 206A, 206B includes or is coupled to a memory storing instructions for performing processor 206A, 206B functions for performing the functions described below. The processor 206A, 206B may also be integrated with the gaming device 204A, 204B (e.g. a single processor performs gaming device 204A, 204B functions as well as the cash-out and cash-in functions described below, which use the biometric sensor 208A, 208B, user interface 210A, 210B, and optional token acceptor/dispenser 250A, 250B.

The biometric sensor 208A, 208B senses the player's 104 biometric (i.e. fingerprint) as described below, and provides biometric data representative of the player's biometric to the processor 206A, 206B for processing. The data provided by the biometric sensor may be raw data, or may be processed data. For example, the biometric sensor 208A, 208B may compute fingerprint metrics from the player's fingerprint and transmit those metrics to the processor 206A, 206B in lieu of raw data.

The user interface 210A, 210B may include an input device 211A, 211B such as a keyboard and an output device such as a cathode ray tube, liquid crystal, or other display. The user interface 210A, 210B accepts input from the player and/or provides output and information to the player as well.

In one embodiment, the biometric sensor 208 is integrated with one or more input devices 211A, 211B of the user interface 210 so that when the user uses the input device 211A, 211B to enter a command or data, the user's biometric is taken concurrently or at or near the same time.

Gaming stations 202A, 202B may each also include a wireless transceiver 213A, 213B for communicating with the casino 260, financial institution 262, or external devices such as a smartphone 274 or similar device. Smartphone 274 comprises one or more input devices such as a touch screen display 272 and/or buttons, and also comprises a biometric sensor 274.

The optional token acceptor/dispenser 250A, 250B dispenses and/or accepts tokens to/from the player 104 as described below. The tokens can comprise any medium capable of storing data, including a printed token, a token having a magnetic stripe, or a solid state memory device such as a flash drive, smart card, and the like.

The gaming device 204A, 204B may also be communicatively coupled to a casino network 260 having other gaming devices.

The payout station 212A comprises a payout device 214A a processor 216A, a biometric sensor 218A (which may be a fingerprint sensor), wireless transceiver 222A, a user interface 220A having one or more input devices 221A, and an optional token acceptor/dispenser 252A. In one embodiment, the payout device 214A is a cash dispenser that can dispense bills in one or more denominations ($20, $10, $5, and $1 bills). The payout device 214A may also comprise a coin dispenser. The payout station 212A may also permit the person to cash-into the system 200, by accepting cash or by accepting indicia of monetary value (such as a cryptocurrency) from the smartphone 274 or analogous device. As was the case with the gaming station, one or more of the input devices 221 may be integrated with one or more of the biometric sensors 218A so that biometrics are measured when an input is provided using the input device 221A.

In another embodiment, the payout device 214A comprises an RTD such as an automated teller machine (ATM) communicatively coupled to a financial institution 262 via link 264 to remotely perform financial transactions. In this embodiment, the payout device 214A generally includes a dedicated user interface that includes a cash acceptor, a cash dispenser, an ATM card reader, a keyboard or keypad, and a display.

The payout device 214A is communicatively coupled to a processor 216A. The processor 216A includes, or is coupled to, a memory storing instructions for performing processor 216A functions. The processor 216A is communicatively coupled to the payout device 214A, the fingerprint sensor 218A, the user interface 220A and the optional token acceptor/dispenser 252A to perform the cash-in and cash-out operations described below. The processor 216A may be integrated with the payout device 214 used to perform payout device 214A functions. Optional payout station 212B comprises components analogous to those of payout station 212A. Also note that the term "payout station" and "payout device" is used above for the sake of convenience. As described herein below, the "payout station" may also be used to "cash in" and credit one of the gaming devices 204A, 204B with the appropriate number of credits as well. Hence, in some embodiments, the "payout station" may also be regarded as a "transaction station" where funds can be obtained and applied to a gaming device or funds from a gaming device may be paid out or applied to an account such as an ATM account at a financial institution.

Figure 3:
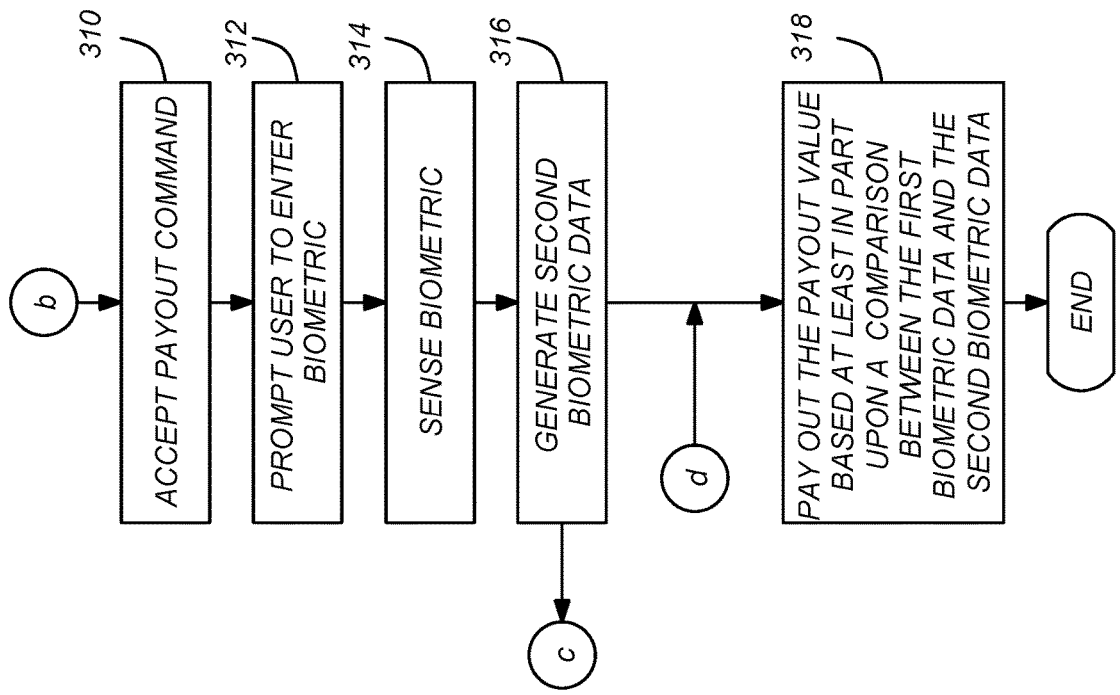
FIG. 3 is a flow chart presenting an illustrative example of how a player may use the GMPS to cash out of a gaming device.
Figure 3:
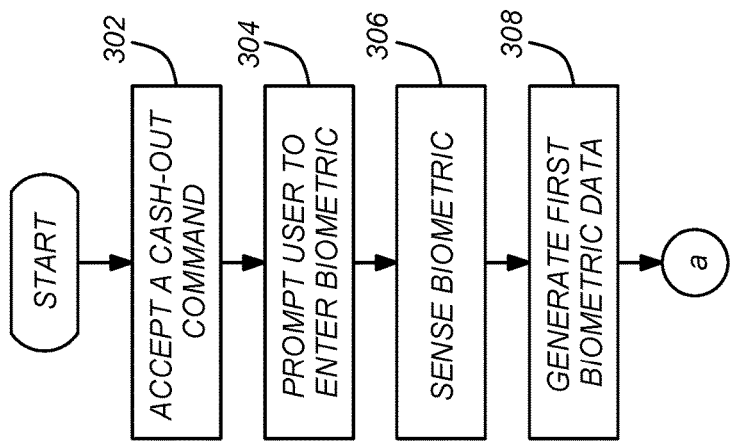

FIG. 3 is a flow chart presenting an illustrative example of how a player 104 may use the GMPS 200 to cash out of a gaming device 204A. In block 302, the gaming station 202A accepts a cash-out command from the player 104. This cash-out command may be provided using the user interface integrated with the gaming device. The cash-out command is made available to the processor 206A which, using user interface 210A or the user interface integrated with the gaming device 204A, prompts the user to enter their biometric as shown in block 304. In one embodiment, the biometric is a fingerprint and the user enters the biometric by applying their finger or thumb to fingerprint sensor 208A. In other embodiments, the person need not be prompted to enter the biometric. For example, if the biometric sensor is a visual sensor that uses facial recognition, the visual sensor may obtain the required image information without prompting the person to gaze toward the sensor.

The biometric sensor 208A senses the biometric of the player 104, as shown in block 306. First biometric data is generated from the biometric, as shown in block 308. The first biometric data may be raw data (e.g. a bitmap of the player's fingerprint), or might comprise biometric metric data (such as that which is used by law enforcement agencies to compare fingerprint data stored in databases). The translation of the biometric data from raw to processed data may also occur in the biometric sensor 208A itself (many commercially available devices perform such translations), by the processor 206A, or may be shared between the biometric sensor 208A and the processor 206A.

The player 104 may then leave the gaming station 202A and proceed to the payout station 212A. The player 104 provides a payout command to the payout station 212A, as shown in block 310. This may be accomplished using the user interface included with the payout device 214A, or using user interface 220A. The payout station 212A may prompt the player 104 to enter his/her biometric (for example, by placing the same finger on the payout station's fingerprint sensor 218A), as shown in block 312, or the player 104 may simply step up and provide the biometric (e.g. by placing his/her finger on the fingerprint sensor 218A to start the process), in which case, the entry of the payout command and user prompting are unnecessary.

The payout station 212A then senses the player's biometric and generates second biometric data from the sensed biometric, as shown in blocks 314 and 316. The payout station 212A then pays out a monetary value transferred from the gaming station 202A (for example, the payout value) based at least in part on a comparison between the first biometric data and the second biometric data, as shown in block 318. Other data may be used to determine whether to pay out the payout value. For example, the player 104 may be prompted to enter a password when cashing out of the gaming station 202A, and prompted for that same password when attempting to collect the payout from the payout station 212A.

The present invention can be practiced in several embodiments. In a first of such embodiments, the first biometric data and monetary (payout) value is transmitted to the payout station 212A, which compares the first biometric data with the second biometric data, and based on that comparison made by the payout station 212A, provides the player 104 with the payout. This embodiment requires a communication link between the gaming station 202 and the payout station 212A, and also requires that the first biometric data be transmitted to and stored in the payout station 212A, at least until the player 104 obtains their payout from the payout station 212A.

In a second embodiment, the second biometric data is transmitted to the gaming station 202A, which compares the first and second biometric information and commands the payout station 212A to make the payout. This requires that the gaming station 202A at least temporarily store the biometric data (until such time that the first and second fingerprint data can be compared), but does not require transmission of biometric data to the payout station 212A, nor storage of biometric data in the payout station 212A.

In a third "sneaker-net" embodiment, the payout value, biometric data and any other information is embodied into a token (such as a paper token with printed data or barcode(s), or a magnetic stripe, a smart card, a flash memory USB token) that the player 104 takes to the payout station 212A. Many people are reluctant to provide their biometrics for public identification purposes, fearing that the data might be stored and/or used in some nefarious way. This embodiment is advantageous because neither the first or second biometric data need be stored by either the gaming station 202A or the payout station 212A, nor is any communication link (e.g. 252) required.

Figure 4A:
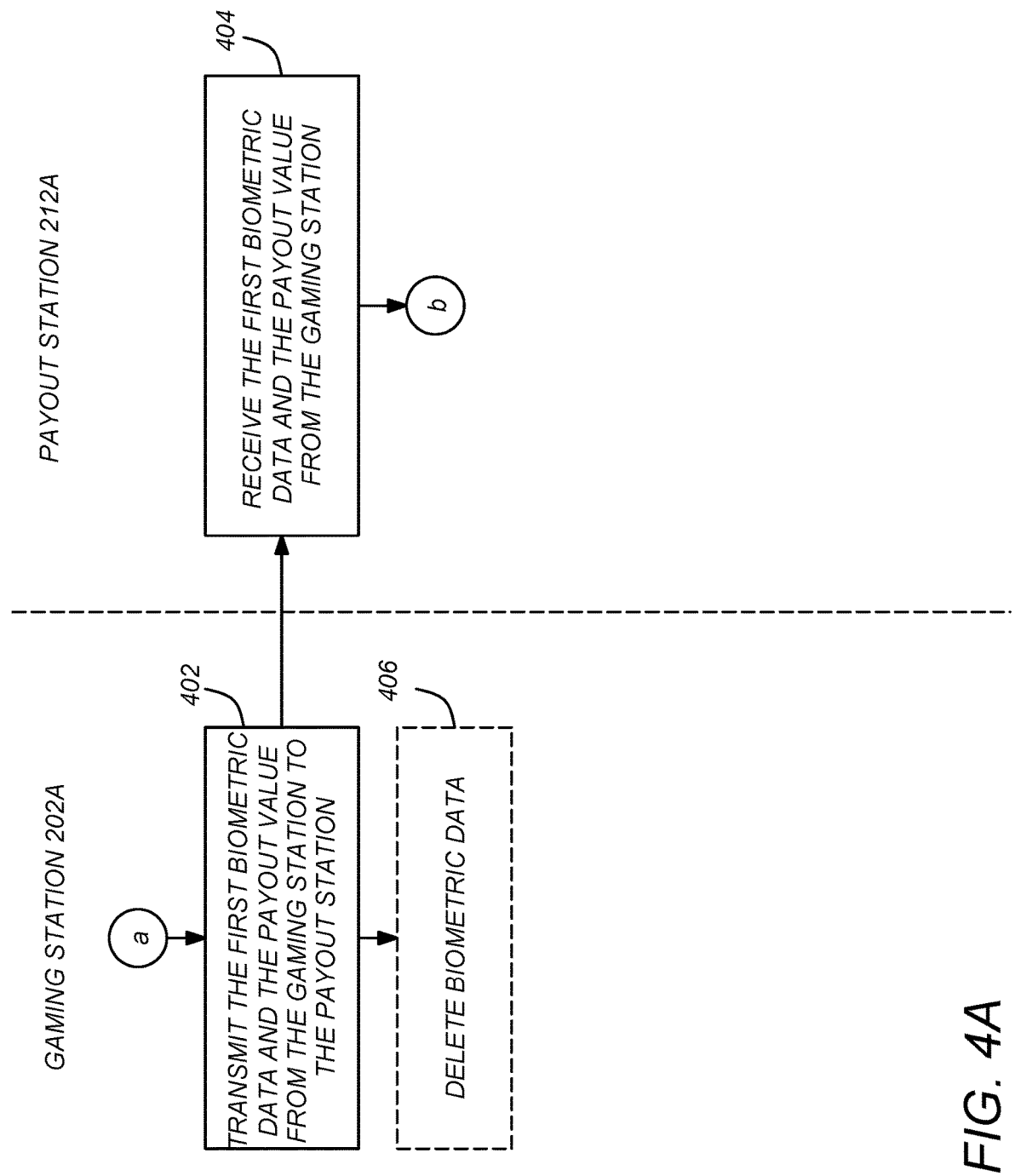

FIG. 4A is a flow diagram illustrating the first embodiment described above. After the gaming station 202A has generated the first biometric data (block 308), the gaming station 202A transmits a message having the first biometric data and the monetary value (e.g. cash-out or payout value) to the payout station 212A, as shown in block 402.

Preferably, the biometric data and the monetary value are encrypted before transmitting them to the payout station 212A. The encryption of the data by the gaming station 202 and the decryption of the encrypted data by the payout station 212A can be accomplished via a shared secret, by public/private key pairs, RSA, or any other method offering adequate security. Being at least somewhat random and unique, the player's biometric data itself may be used to encrypt the payload value as well.

The payout station 212A receives and decrypts the message, if necessary, to recover the biometric data and payout value, as shown in block 404. Processing then proceeds to block 310, in which the payout station 212A compares the first biometric data with the second biometric data, and provides the payout based on this comparison (e.g. if there is a match).

Rather than send the first biometric data when it is generated, the data may be sent only upon request from the payout station 212A (e.g. in response to a payout request from the player 104, as shown in block 310). While this requires the gaming station 202 to temporarily store the biometric data, it relieves the payout station 212A from having to do so.

Many people are reluctant to provide biometric information. One of the reasons for this reluctance is the suspicion that the biometric data will be permanently stored and later transmitted to a remote location external to the GMPS 200, to be used for other purposes. To ameliorate this problem, the gaming station 202A can be designed so that the biometric data from the biometric sensor 208A is not stored in any permanent or semi-permanent way in the gaming station 202A or the payout station 212A, and the gaming station 202A and the payout station 212A together define a gaming system, and the first fingerprint data and the second fingerprint data are not transmitted external to the gaming system. This can be accomplished by accepting the biometric data only into a circular buffer (preferably with a size greater than, but approximating the size required to store the biometric data) and transmitting that data directly to the payout station 212A without storing it elsewhere. It can also be accomplished by storing the data in a solid state, optical, or magnetic memory that is erased or written over as soon as it is transmitted to the payout station 212A and no longer needed. Block 406 shows this process.

FIG. 4B is a flow diagram illustrating the second embodiment described above. In this embodiment, the first biometric data is not transmitted from the gaming station 202A to the payout station 212A, but instead, the second biometric data is transmitted from the payout station 212A to the gaming station 202A for comparison. Referring to FIG. 3, after the second biometric data is generated as shown in block 316, the second biometric data is transmitted from the payout station 212A to the gaming station 202A. At this point, since the comparison between the first and second biometric data is to be accomplished by the gaming station 202A, the biometric data can be deleted or overwritten so as to render it unreadable, as shown in block 454. As was the case in the embodiment of FIG. 4A, the communications between the payout station 212A and gaming station 202A can be encrypted.

The gaming station 202A receives the second biometric data, and compares the first and second biometric data to determine if they match. If they match, a message is sent to the payout station 212A to provide the monetary value or payout, as shown in blocks 458 and 460. If there is no match, no payout is provided, and a message may be provided to the payout station indicating that no match has been obtained. The message may include the payout value and be encrypted as well. If they do not match, a message indicating that no payout will be made may be sent to the payout station 212A. Once the payout has occurred, the first and second biometric data can be deleted or overwritten so as to render it unreadable, as shown in block 462. Logic returns to block 318, which describes paying out the payout value based on a comparison (in this case, performed by the gaming station 202A) between the first biometric data and the second biometric data.

Figure 5:
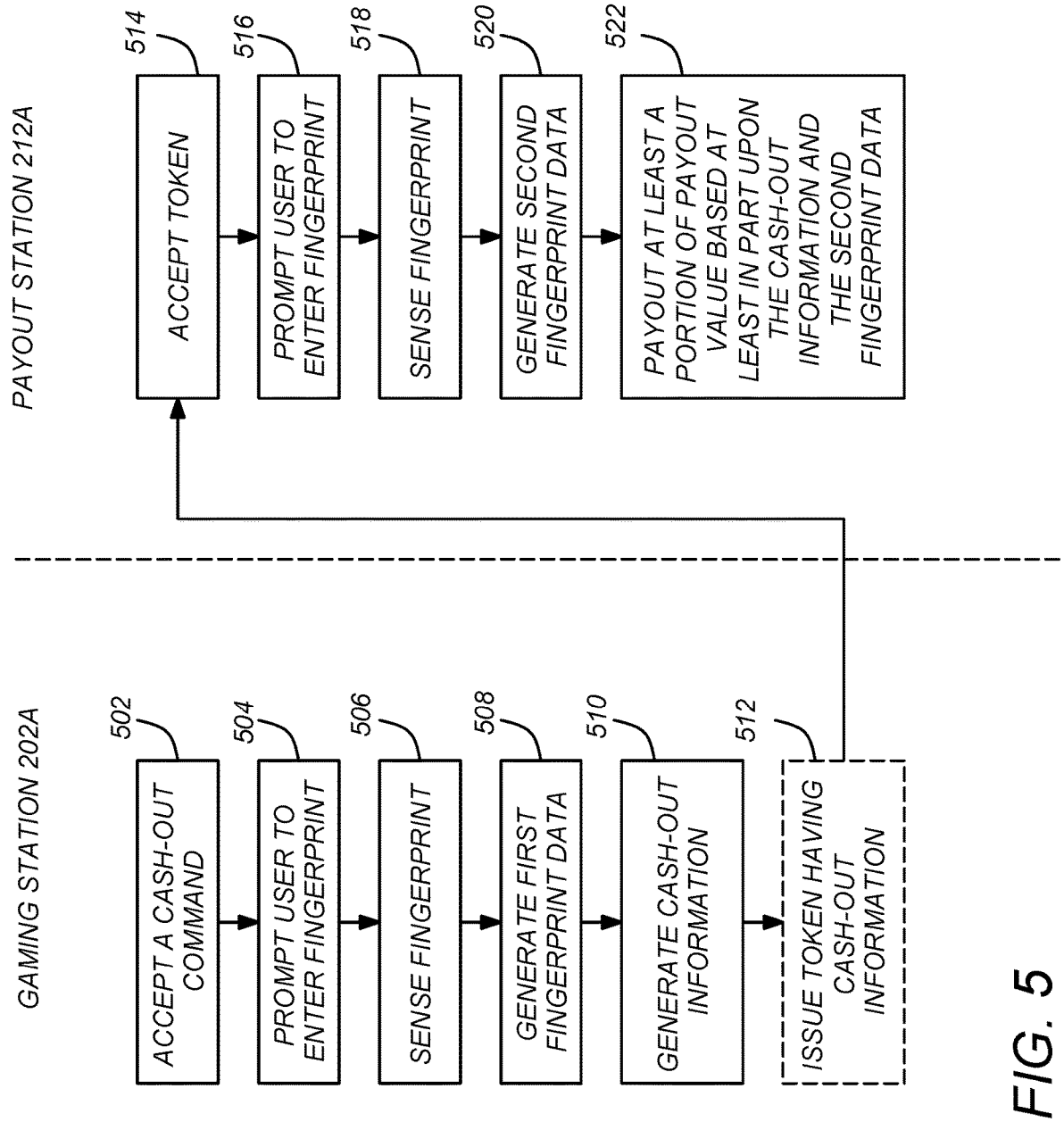
FIG. 5 is a flow chart illustrating the use of a token to share fingerprint data.

FIG. 5 presents a flow diagram illustrating the third embodiment, in which the biometric data and payout data are provided from the gaming station 202A to the payout station 212A via a token. Using the interface in the gaming device 204A or the user interface 210A of the gaming station 202A, the player 104 enters a cash-out command, which is accepted by the gaming station 202A as shown in block 502. The user is prompted to enter their biometric, as shown in block 504. The biometric sensor 208A senses the biometric as shown in block 506, and first biometric data is generated, as shown in block 508. This first biometric data may be generated by the biometric sensor 208A itself, by the processor 206A or by a processor inherent to the gaming device 204A upon receipt of the sensed biometric.

Cash-out information, which includes the payout and the first biometric data, is generated as shown in block 510 and a token having the cash-out information is issued with the token acceptor/dispenser 250A, as shown in block 512.

The player 104 removes the token and brings it to the payout station 212A. The player provides the token for input into the payout station 212A. The payout station 212A accepts the token (e.g. using the token acceptor/dispenser 252A of the payout station 212A), and prompts the user to enter their biometric, as shown in blocks 514 and 516. The biometric sensor 218A senses the biometric, and second biometric data is generated, as shown in blocks 518 and 520. Next, at least a portion of the payout is made based upon the cash-out information and the second biometric data, as shown in block 522.

In one embodiment, the cash-out information may comprise the separate biometric and payout information, either or both of which can be encrypted before the gaming station 202A records the data on the token. The payout station 212A, using a shared secret or a private/public key paradigm, decrypts the payout and first biometric information, compares the first and second biometric data, and issues the required payout based on that comparison.

If desired, first biometric data and the payout value can be combined to form the cash-out information. For example, the payout value may be hashed or otherwise processed with the biometric data to create the cash-out information. Then, the second biometric data obtained at the payout station 212 can be used to recover the payout value from the token, essentially using the player's biometric as a shared secret. For additional security, the biometric and/or the payout value may be encrypted before being combined, using a secret shared between the gaming station and the payout station, or public/private key pairs.

The embodiment shown in FIG. 5 has a number of particular advantages. First, the gaming station 202A and the payout station 212A need not be communicatively coupled to one another to share information. Instead, the information is shared through a token issued to the player 104. Second, since the biometric data (or some form of it) is stored by the token, there is no need to store the biometric data in either the gaming station 202A or the payout station 212A. As described above, appropriately sized buffers can be used to temporarily store biometric data so that computations and other necessary operations may be performed, but so that the buffered storage overwritten by other data entering the buffer.

Figure 6:
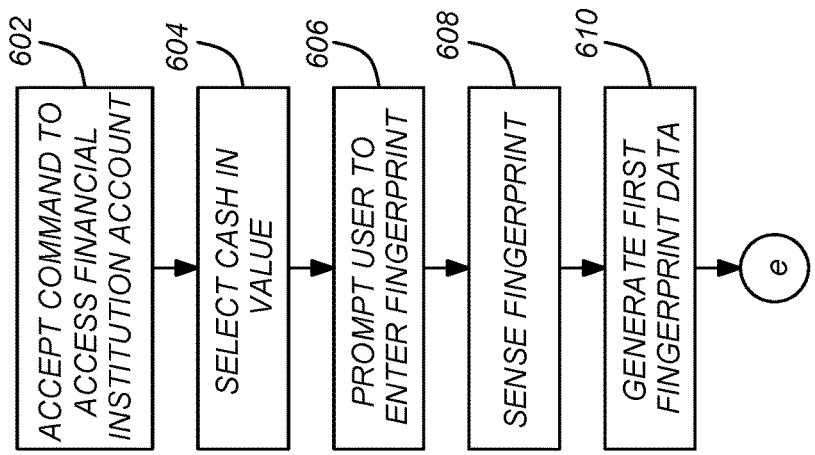
FIG. 6 is a drawing illustrating how the GMPS can be used to allow the player to use the payout station to cash into a gaming station.
Figure 6:
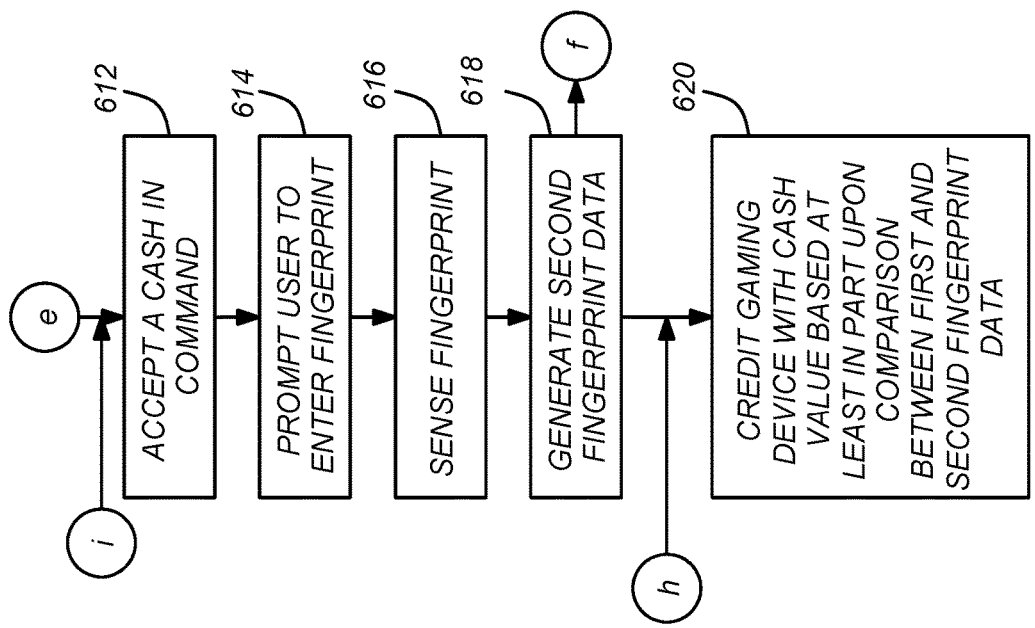

FIG. 6 is a drawing illustrating how the GMPS 200 can be used to allow the player 104 to use the payout station 212A to cash into a gaming station 202A (instead of cashing out, as described above). The player 104 approaches the payout station 212A and issues a command to access their account in a financial institution 262. Typically, this involves the insertion of a device such as an ATM card into the user interface of the payout device 214A (in this example, hereinafter referred to as the RTD or ATM), the entry of a suitable password, and navigation of a menu using the user interface of the ATM 214A. The player 104 then selects a desired cash-in value, as shown in block 604. In one embodiment, the user may also indicate which gaming station 202A the user would like to play. The payout station 212A may then reserve that gaming station (e.g. by disabling that gaming station 202 from play for any other person. The payout station 212A prompts the user to enter their biometric 606, senses the biometric 608, and generates first biometric data 610.

The player 104 then moves to the gaming station 202A, and provides a cash-in command which the gaming station 202A accepts, as shown in block 612. The gaming station prompts the player 104 to enter their biometric, as shown in block 614. The player 104 places their finger on the biometric sensor 208A, and the biometric sensor 208A senses the biometric, as shown in block 616. Second biometric data is then generated from the sensed biometric, as shown in block 618. This can be accomplished by the biometric sensor 208A or the processor 206A. The gaming station 202A is credited with the cash-in value selected in block 604 based upon a comparison between the first and second biometric data.

It may occur that the player 104 changes their mind after entering their biometric and decides not to play at any of the gaming stations 202. If this happens, the player may then simply return to the payout station 212A, enter their biometric. The payout station 212 compares the new biometric with the stored biometric, and if the two match, the player 104 is provided with a number of options, including crediting the cash-in value back into the player's account.

As was the case with the cash-out embodiments, there are several ways by which the biometric data and the cash-in value may be provided so as to enable the comparison and credit operations shown in block 620.

Figure 7A:
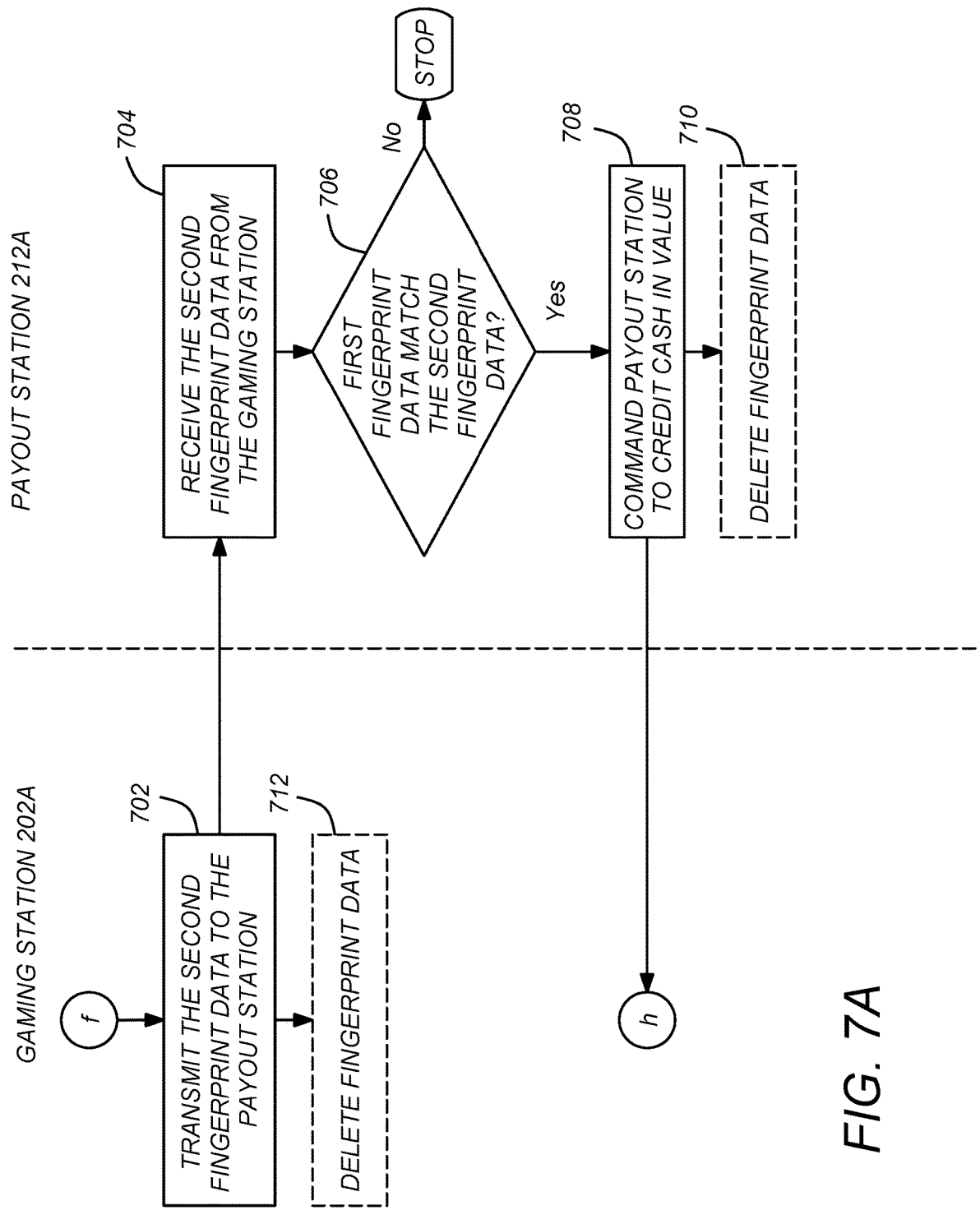
FIGS. 7A and 7B are flow charts illustrating how the cash-in value may be provided from the payout station to the gaming station.

FIG. 7A illustrates an exemplary embodiment of how the cash-in value may be provided from the payout station 212A to one of the gaming stations 202A, 202B (in this case, gaming station 202A). In this embodiment, the player 104 has already used the payout station 212A to enter their biometric. The player 104 then goes to the gaming station 202A, provides a cash-in command and enters their biometric, as shown in blocks 612-616. The gaming station 202A generates second biometric data and logic moves to block 702 of FIG. 7A, which illustrates the transmission of the second biometric data to the payout station 212A. The payout station 212A receives the second biometric data and compares it to the first biometric data to determine if there is a match (the data are close enough to declare that they are from the same person with adequate certainty). If not, processing stops and a message may be sent to the gaming station 202 if desired. If a sufficient match is found by block 706, the gaming station is commanded to credit the cash-in value, as shown in block 708. Otherwise, no credit is commanded, and a message may be provided to this effect. Of course, as was described above, the foregoing communications are preferably encrypted. Finally, the biometric data stored in the payout station 212A and/or the gaming station 202A can be deleted, as shown in blocks 710 and 712.

Figure 7B:
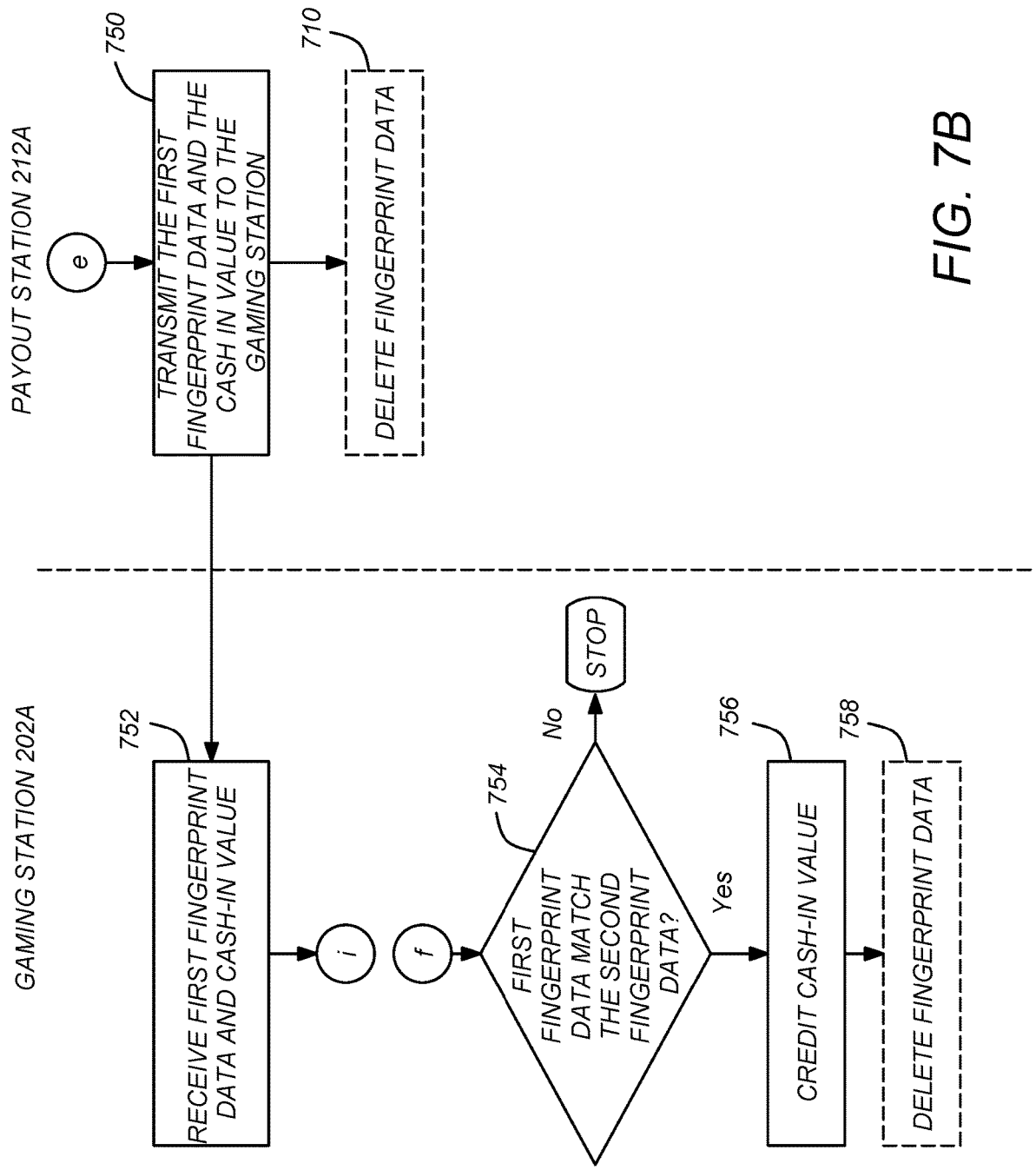

FIG. 7B illustrates another exemplary embodiment of how the cash-in value may be provided from the payout station 212A to one of the gaming stations 202A, 202B (in this case, gaming station 202A). In this embodiment, the player has already used the payout station 212A to enter their biometric. Beginning in block 750, the first biometric data is transmitted to the gaming station 202.

In one embodiment, the first biometric data is sent only to a gaming station 202 that was identified earlier (for example, when the player 104 enters the cash-in value, they may also enter which gaming station 202 they would like to play). In this embodiment, when the player 104 cashes in to a selected gaming station 202A, the selected gaming station 202A is locked so that no other player can play it until the player 104 cashes in. To prevent a player 104 from reserving a machine for an inordinate period of time, the payout station may release the gaming station 202A after a period of time, and re-credit the player's account. Or, the player's account may only be debited when the credit has been applied to the first gaming station 202A and accepted by entering the cash-in command and biometric.

Next, the gaming station 202A receives the first biometric data and the cash-in value, and transfers flow to block 612 of FIG. 6. After the second biometric data is generated, it is checked to see if it sufficiently matches the first biometric data in block 754. If it does, the cash-in value is credited to the gaming machine 202 and the player 104 can commence play. Of not, processing ends and a message may be transmitted to the payout station 212A. Any biometric data stored in the gaming station 202A and payout station 212A can be deleted after they are no longer required.

Figure 8:
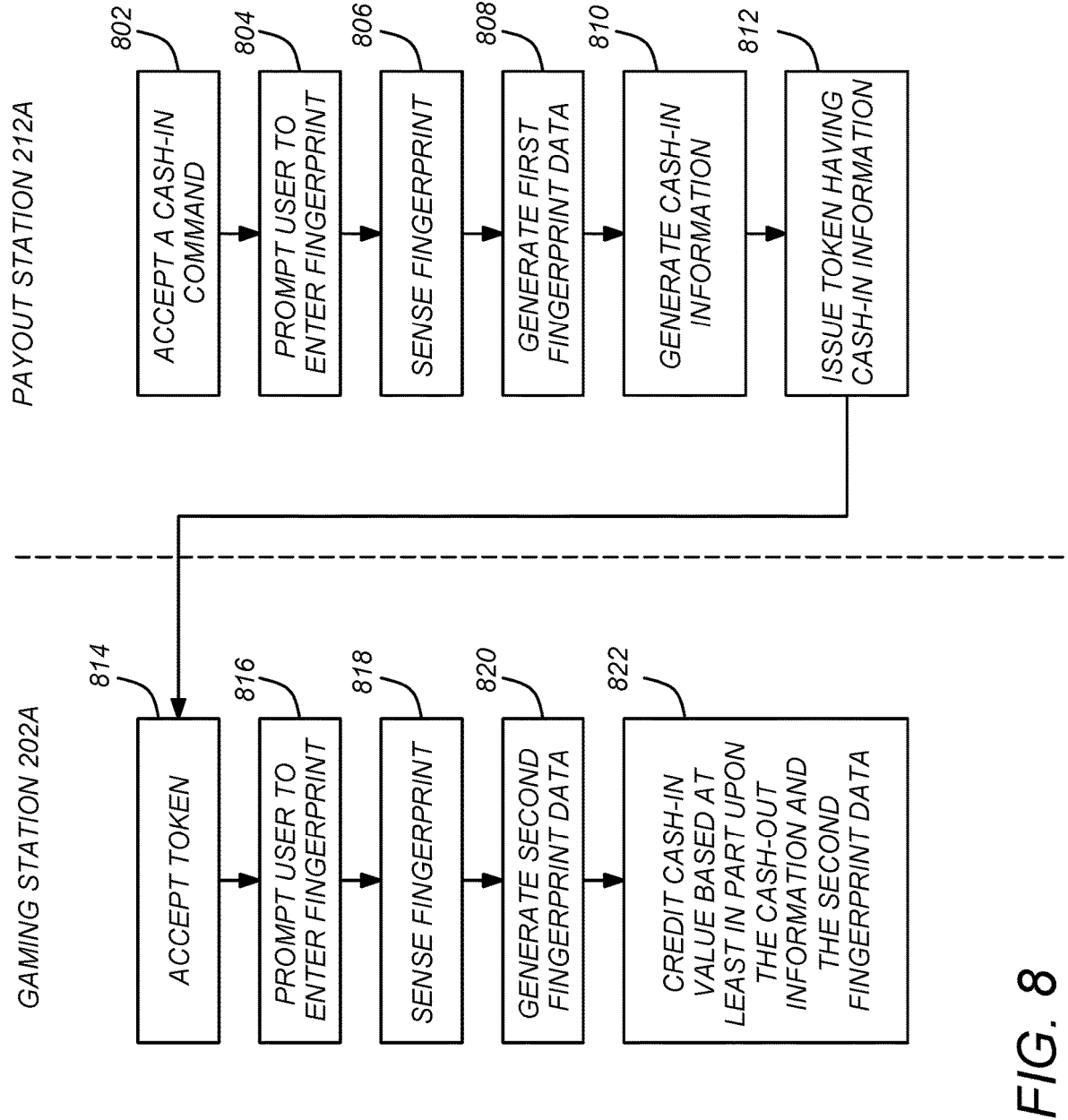
FIG. 8 is a flow chart illustrating the use of a token to share fingerprint data for cash-in purposes.

FIG. 8 is a diagram illustrating another exemplary embodiment of how the cash-in value may be provided from the payout station 212 to the gaming station 202. In this embodiment, the first biometric and cash-in information are stored on a token. The cash-in command is received in the payout station, as shown in block 802. The user is prompted to enter a biometric, the entered biometric is sensed, and cash-in information is generated from the first biometric data, as shown in blocks 804-810. The cash-in data includes the cash-in value and first biometric data. This data can be combined and/or encrypted and/or secured with a password as described above with respect to the cash-out data.

The player 104 takes the token to the gaming machine of their choice, and inserts the token into the token acceptor/dispenser 250A. The gaming station 202A accepts the token, optionally prompts the user to enter their biometric, senses the entered biometric, and generates second biometric data, as shown in blocks 814-820. If the first and second biometric data sufficiently match, the cash-in value is credited to the gaming station 202A and the player 104 can begin play.

Processors 206A, 216A may be special purpose processors or may be implemented by a computer system.

Figure 9:
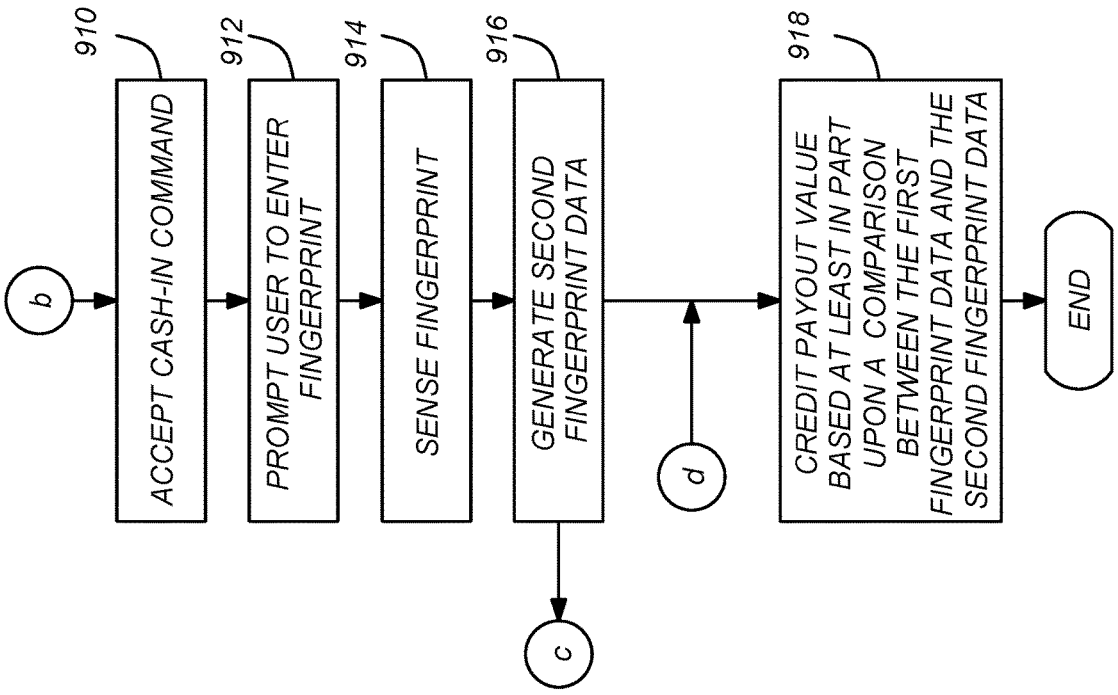
FIG. 9 is a flow chart presenting an illustrative example of how a player may use the GMPS to cash out of a gaming device and cash in to another.
Figure 9:
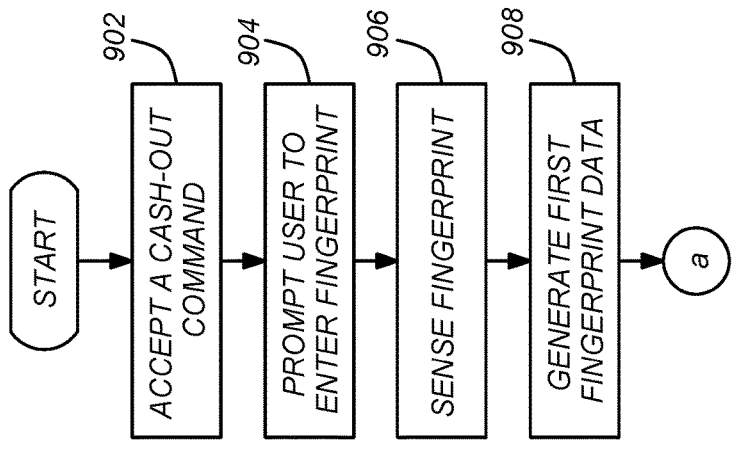

FIG. 9 is a flow chart presenting an illustrative example of how a player 104 may use the GMPS 200 to transfer the credits from a first gaming station 202A to a second gaming station 202B. In block 902, the gaming station 202A accepts a cash-out command from the player 104. This cash-out command is typically provided using the user interface integrated with the gaming device. The cash-out command is made available to the processor 206A which, using user interface 210A or the user interface integrated with the gaming device 204A, prompts the user to enter their biometric by applying their finger or thumb to biometric sensor 208A, as shown in block 904. The biometric sensor 208A senses the biometric of the player 104, as shown in block 906. First biometric data is generated from the biometric, as shown in block 908. The first biometric data may be raw data (e.g. a bitmap of the player's biometric), or might comprise biometric metric data such as that which is used by law enforcement agencies to compare biometric data stored in databases. The translation of the biometric data from raw to processed data may also occur in the biometric sensor 208A itself (many commercially available devices perform such translations), by the processor 206A, or may be shared between the biometric sensor 208A and the processor 206A.

The player 104 may then leave the first gaming station 202A and proceed to the second gaming station 202B. The player 104 provides a cash-in command to the second gaming station 202B, as shown in block 910. This may be accomplished using user interface 210B. The second gaming station 202B may prompt the player 104 to enter his/her biometric by placing the same finger on the biometric sensor 208B, as shown in block 912, or the player 104 may simply step up and place his/her finger on the biometric sensor 208B to start the process, in which case, the entry of the cash-in command and user prompting are unnecessary.

The second gaming station 202B then senses the players biometric and generates second biometric data from the sensed biometric, as shown in blocks 914 and 916. The second gaming station 202B then credits the payout value to the second gaming station 202B based at least in part on a comparison between the first biometric data and the second biometric data, as shown in block 918. Other data may be used to determine whether to pay out the payout value. For example, the player 104 may be prompted to enter a password when cashing out of the gaming station 202A, and prompted for that same password when attempting to collect the cash into the second gaming station 202B.

The present invention can be practiced in several embodiments. In a first of such embodiments, the first biometric data and payout value is transmitted to the second gaming station 202B, which compares the first biometric data with the second biometric data, and based on that comparison made by the second gaming station 202B, provides or credits the payout value to the second gaming station 202B. This embodiment requires a communication link between the gaming station 202A and the second gaming station 202B, and also requires that the first biometric data transmitted to and stored in the second gaming station 202B, at least until the player successfully transfers the credits to the second gaming station 202B.

In a second embodiment, the second biometric data is transmitted from the second gaming station 202B to the first gaming station 202A, which compares the first and second biometric information and commands the second gaming station 202B to provide the credits. This requires that the first gaming station 202A at least temporarily store the biometric data (until such time that the first and second biometric data can be compared), but does not require transmission of biometric data to the second gaming station 202B, nor storage of biometric data in the second gaming station 202B.

In a third "sneaker-net" embodiment, the payout value, biometric data and any other information is embodied into a token (such as a paper token with printed data or barcode(s), or a magnetic stripe, a smart card, a flash memory USB token) that the player 104 takes to the second gaming station 202B. Many people are reluctant to provide their biometric for public identification purposes, fearing that the data might be stored and/or used in some nefarious way. This embodiment is advantageous because neither the first or second biometric data need stored by either the first gaming station 202A or the second gaming station 202B, nor is any communication link (e.g. 252) required.

Figure 10A:
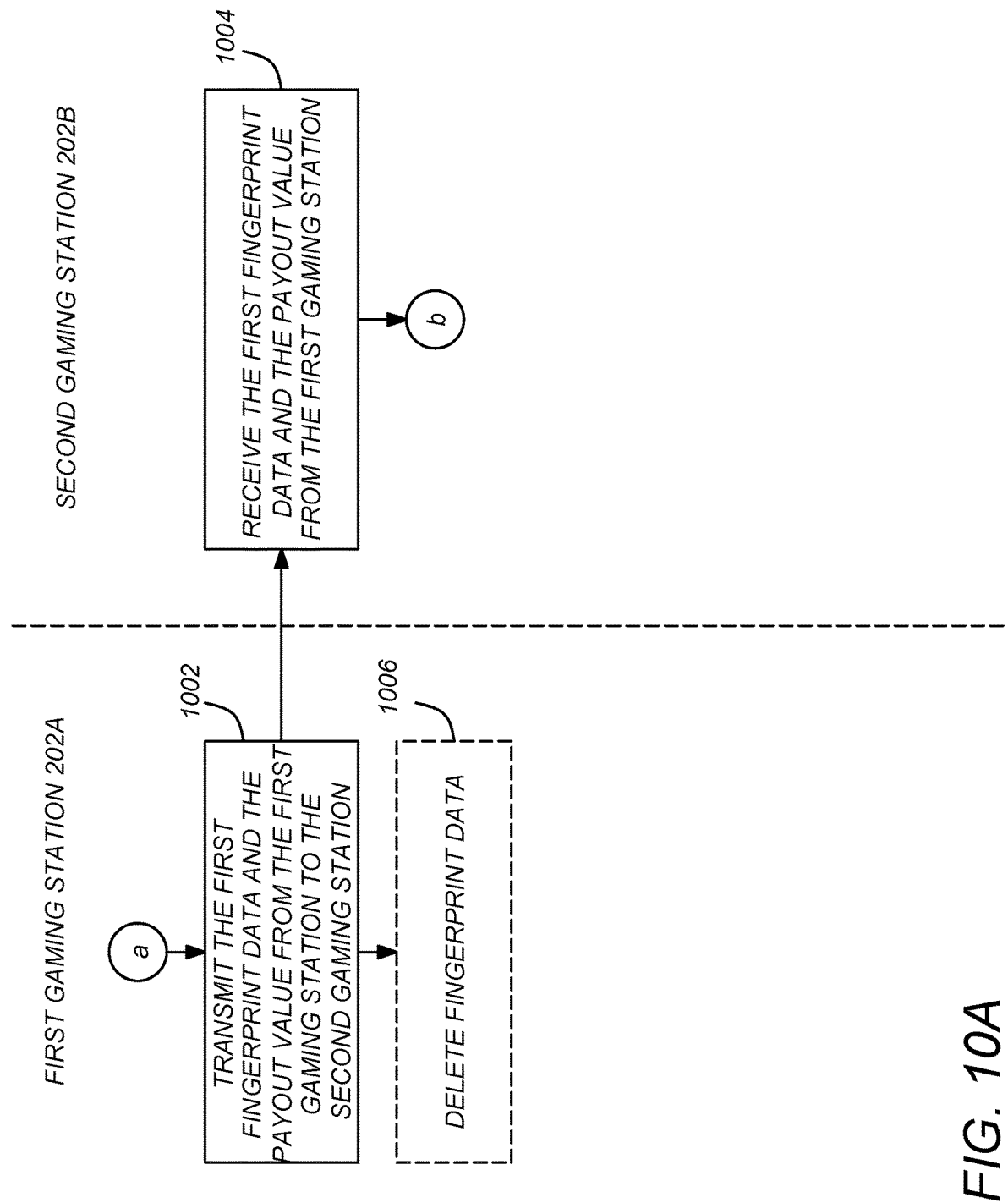
FIGS. 10A and 10B are flow charts illustrating techniques for sharing fingerprint data for cash-out and cash-in purposes.

FIG. 10A is a flow diagram illustrating the first embodiment described above. After the first gaming station 202A has generated the first biometric data (block 908), the gaming station 202A transmits a message having the first biometric data and the cash-out (or payout) value to the second gaming station 202B, as shown in block 1002.

Preferably, the biometric data and the payout value are encrypted before transmitting them to the second gaming station 202B. The encryption of the data by the first gaming station 202A and the decryption of the encrypted data by the second gaming station 202B can be accomplished via a shared secret, by public/private key pairs, RSA, or any other method offering adequate security. Being at least somewhat random and unique, the player's biometric data itself may be used to encrypt the payload value as well.

The second gaming station 202B receives and decrypts the message, if necessary, to recover the biometric data and payout value as shown in block 1004. Processing then proceeds to block 910. Rather than send the first biometric data when it is generated, the data may be sent only upon request from the second gaming station 202B (e.g. in response to a cash-in request from the player 104). While this requires the first gaming station 202A to temporarily store the biometric data, it relieves the second gaming station 202B from having to do so.

Many people are reluctant to provide biometric information. One of the reasons for this reluctance is the suspicion that the biometric data will be permanently stored and later transmitted to a remote location external to the GMPS 200, to be used for other purposes. To ameliorate this problem, the first gaming station 202A can be designed so that the biometric data from the biometric sensor 208A is not stored in any permanent or semi-permanent way in the gaming station or the second gaming station 202B. This can be accomplished by accepting the biometric data only into a circular buffer (preferably with a size greater than, but approximating the size required to store the biometric data) and transmitting that data directly to the payout station without storing it elsewhere. It can also be accomplished by storing the data in a solid state, optical, or magnetic memory that is erased or written over as soon as it is transmitted to the payout station and no longer needed. Block 1006 shows this process.

Figure 10B:
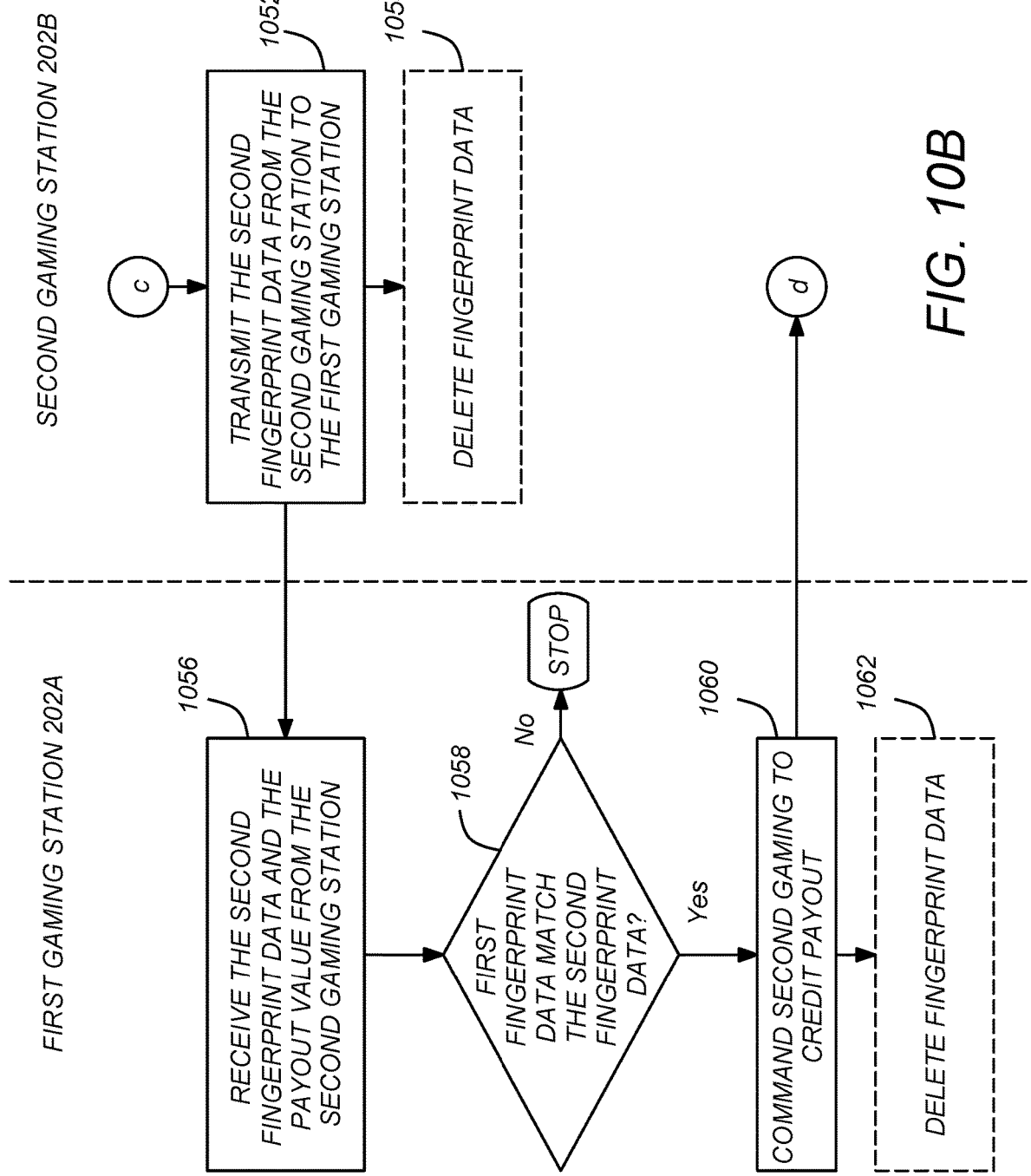

FIG. 10B is a flow diagram illustrating the second embodiment described above. In this embodiment, the first biometric data is not transmitted from the first gaming station 202A to the second gaming station 202B, but instead, the second data is transmitted from the second gaming station 202B to the first gaming station 202A for comparison. Referring to FIG. 9, after the second biometric data is generated as shown in block 916, the second biometric data is transmitted from the second gaming station 202B to the first gaming station 202A, as shown in blocks 1052 and 1056. At this point, since the comparison between the first and second biometric data is to be accomplished by the first gaming station 202A, the biometric data can be deleted, as shown in block 1054. As was the case in the embodiment of FIG. 10A, the communications between the payout station and gaming station can be encrypted.

The first gaming station 202A receives the second biometric data, and compares the first and second biometric data to determine if they match. If they match, a message is sent to the second gaming station 202B to provide the credits, as shown in blocks 1058 and 1060. The message may include the payout value and be encrypted as well. If they do not match, a message indicating that the payout value will not be credited may be sent to the second gaming station 202B. Once the payout has occurred, the first and second biometric data can be deleted, as shown in block 1062. Logic returns to block 918, which describes crediting the payout value based on a comparison (in this case, performed by the first gaming station 202A) between the first biometric data and the second biometric data.

Figure 11:
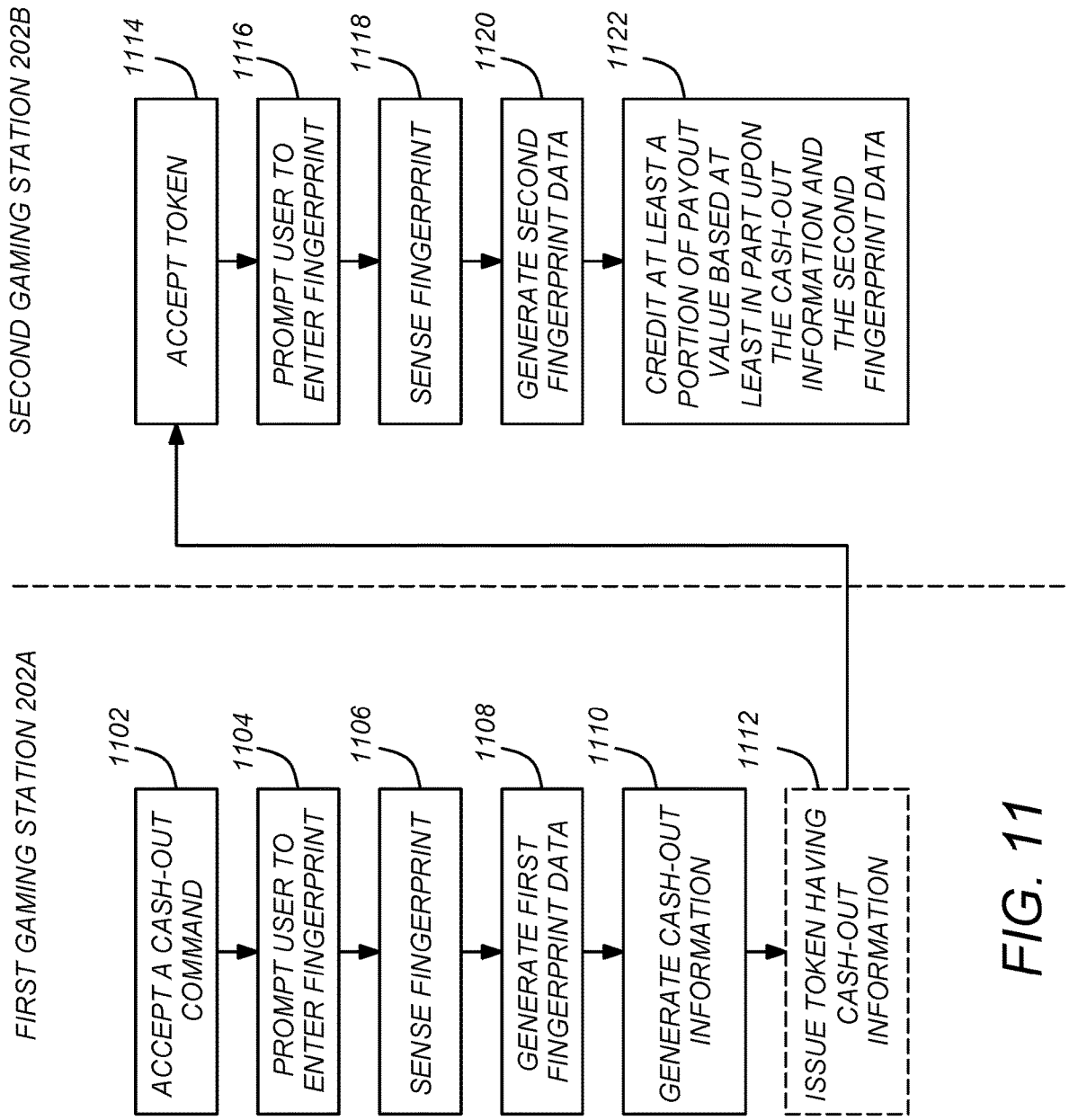
FIG. 11 is a flow chart illustrating the use of a token to share fingerprint data.

FIG. 11 presents a flow diagram illustrating the third embodiment, in which the biometric data and payout data are provided from the first gaming station 202A to the second gaming station 202B via a token. Using the interface in the first gaming device 204A or the user interface 210A of the gaming station 202A, the player 104 enters a cash-out command, which is accepted by the gaming station 202A as shown in block 1102. The user is prompted to enter their biometric, as shown in block 1104. The biometric sensor 208A senses the biometric as shown in block 1106, and first biometric data is generated, as shown in block 1108. This first biometric data may be generated by the biometric sensor 208A itself, by the processor 206A or by a processor inherent to the gaming device 204A upon receipt of the sensed biometric.

Cash-out information, which includes the payout and the first biometric data, is generated as shown in block 1110 and a token having the cash-out information is issued with the token acceptor/dispenser 250A, as shown in block 1112.

The player 104 removes the token and brings it to the second gaming station 202B. The player provides the token for input into the second gaming station 202B. The second gaming station 202B accepts the token (e.g. using the token acceptor/dispenser 250B of the second gaming station 202B), and prompts the user to enter their biometric, as shown in blocks 1114 and 1116. The biometric sensor 208B senses the biometric, and second biometric data is generated, as shown in blocks 1118 and 1120. Next, at least a portion of the payout value is credited based upon the cash-out information and the second biometric data, as shown in block 1122.

In one embodiment, the cash-out information may comprise the separate biometric and payout information, either or both of which can be encrypted before the first gaming station 202A records the data on the token. The second gaming station 202B, using a shared secret or a private/public key paradigm, decrypts the payout and first biometric information, compares the first and second biometric data, and issues the required payout based on that comparison.

If desired, first biometric data and the payout value can be combined to form the cash-out information. For example, the payout value may be hashed or otherwise processed with the biometric data to create the cash-out information. Then, the second biometric data obtained at the second gaming station 202B can be used to recover the payout value from the token, essentially using the player's biometric as a shared secret. For additional security, the biometric and/or the payout value may be encrypted before being combined, using a secret shared between the gaming station and the payout station, or public/private key pairs.

The embodiment shown in FIG. 5 has a number of particular advantages. First, the first gaming station 202A and the second gaming station 202B need not be communicatively coupled to one another to share information. Instead, the information is shared through a token issued to the player 104. Second, since the biometric data (or some form of it) is stored by the token, there is no need to store the biometric data in either the first gaming station 202A or the second gaming station 202B. As described above, appropriately sized buffers can be used to temporarily store biometric data so that computations and other necessary operations may be performed, but so that the buffered storage is overwritten by other data entering the buffer.

The foregoing methods and systems may be implemented using any one or combination of biometrical sensing and identification techniques, including facial recognition by optical sensors (including facial appearance and face geometry as sensed by visible sensors and facial thermograms as determined by infrared sensors or combinations thereof), voice recognition (fixed text, text dependent, text independent, conversational or combinations thereof as sensed by audio sensors), iris and/or retina recognition (using Daugman or Wildes systems and also sensed by optical sensors), hand geometry, and hand vascular pattern identification.

Figure 12A:
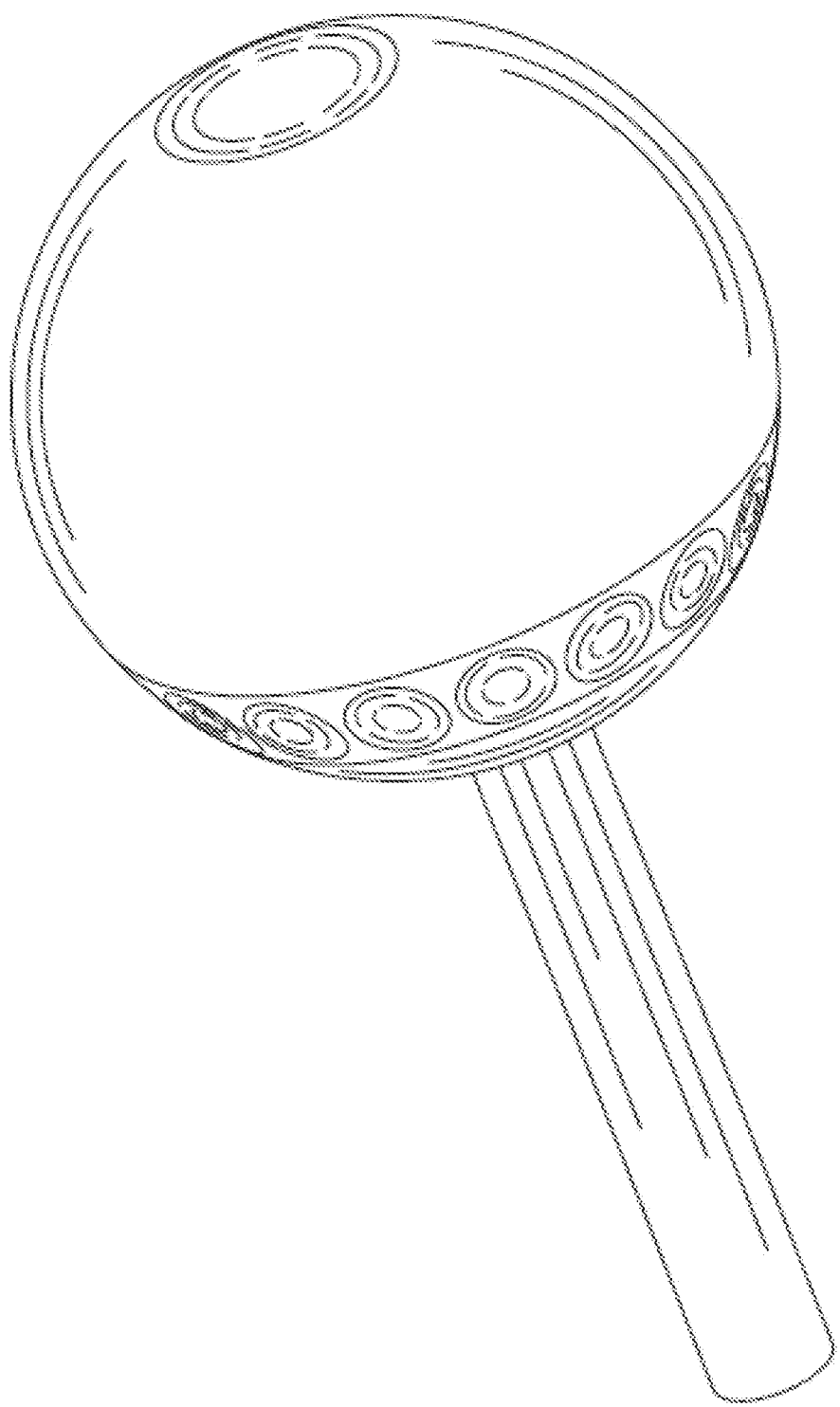
FIGS. 12A-12G are diagrams illustrating embodiments of one or more biometric sensors.
Figure 12B:
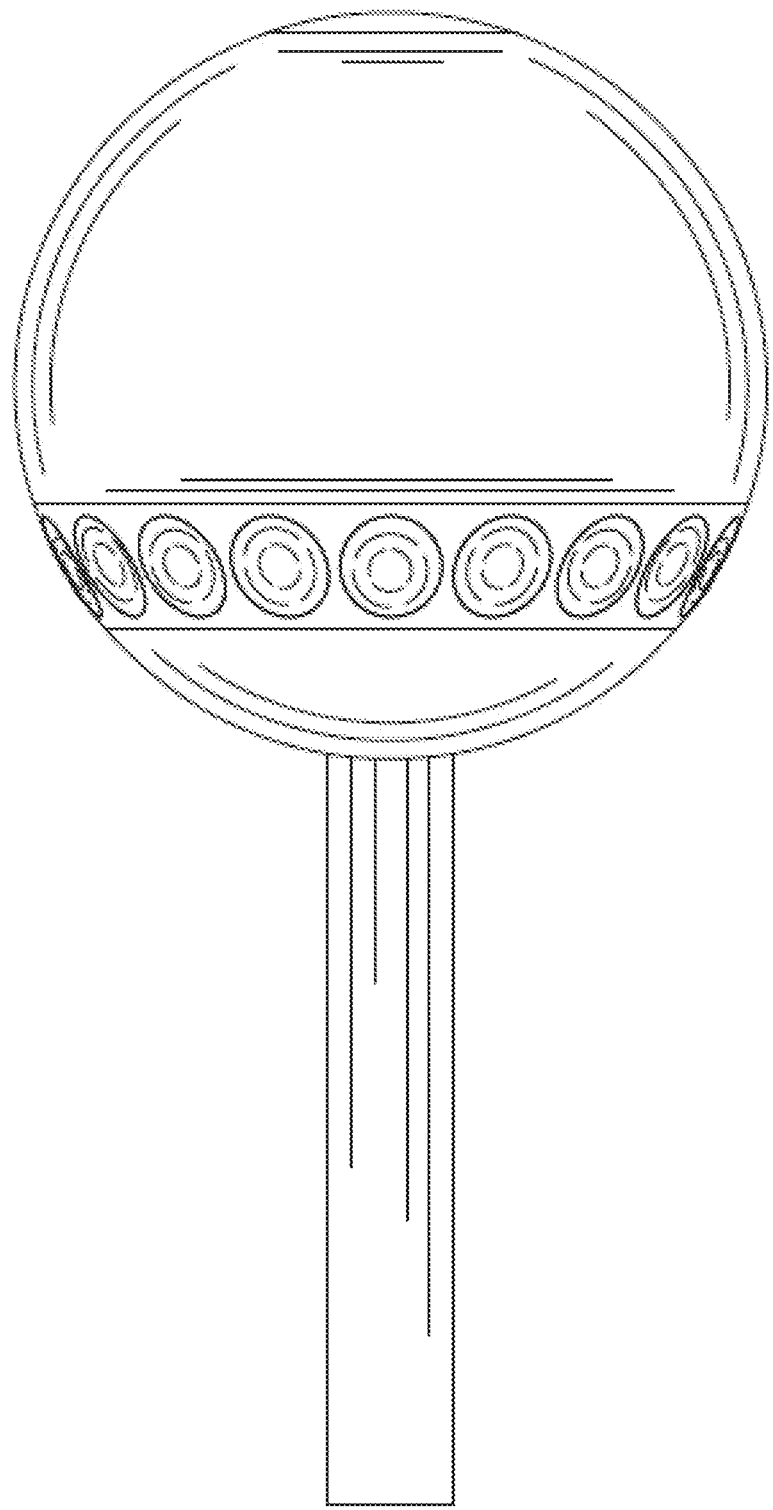
Figure 12C:
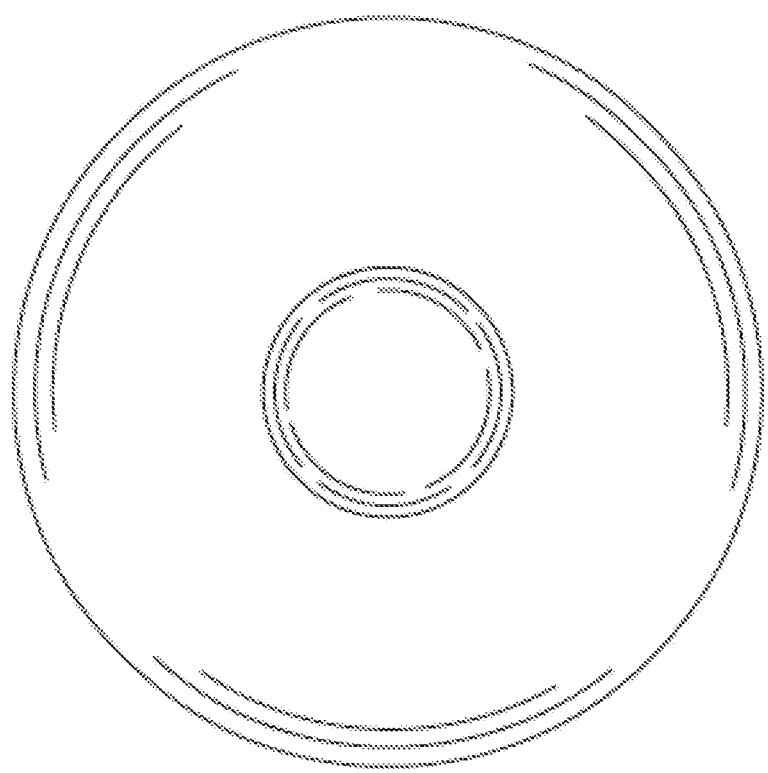
Figure 12D:
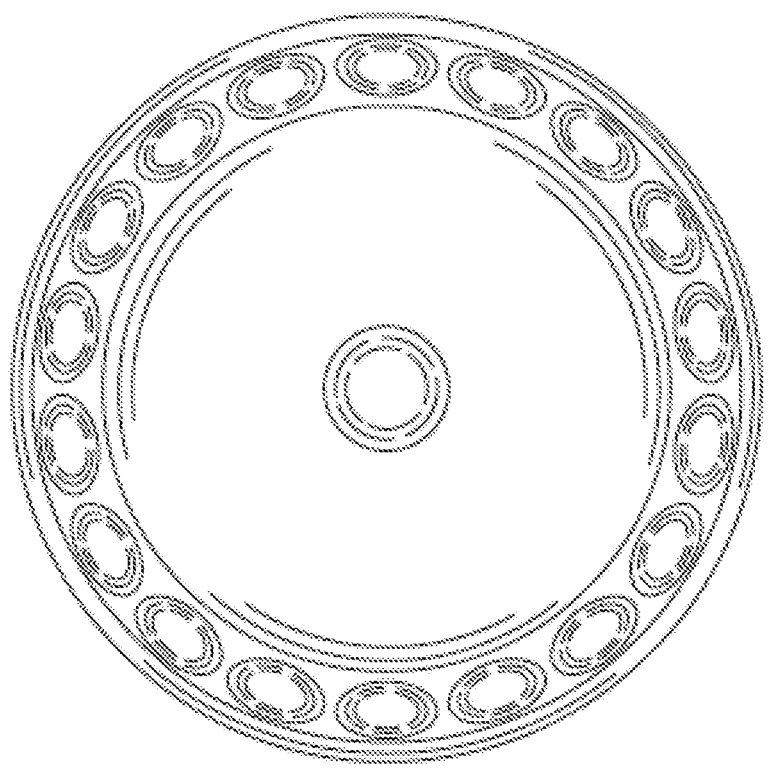
Figure 12E:
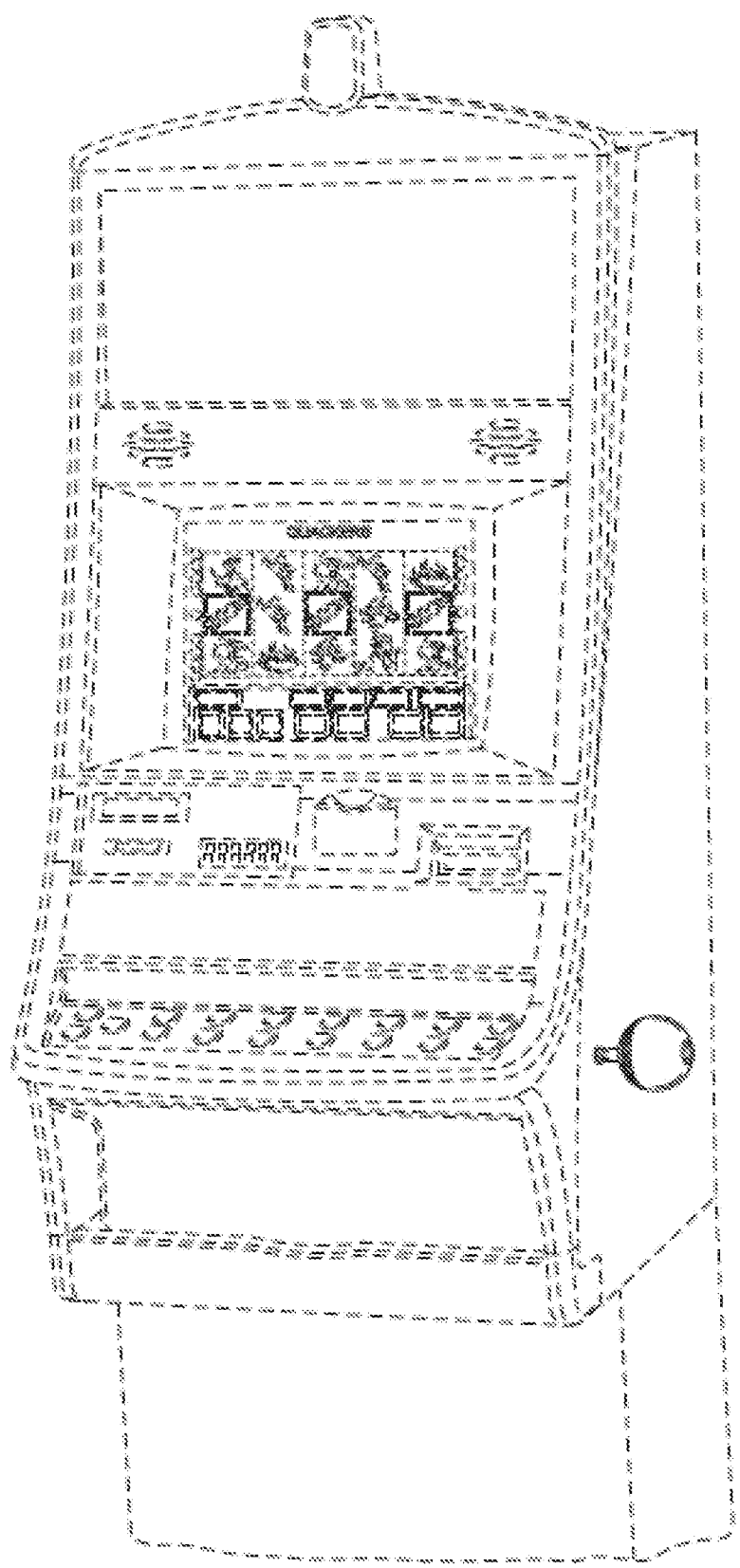
Figure 12F:
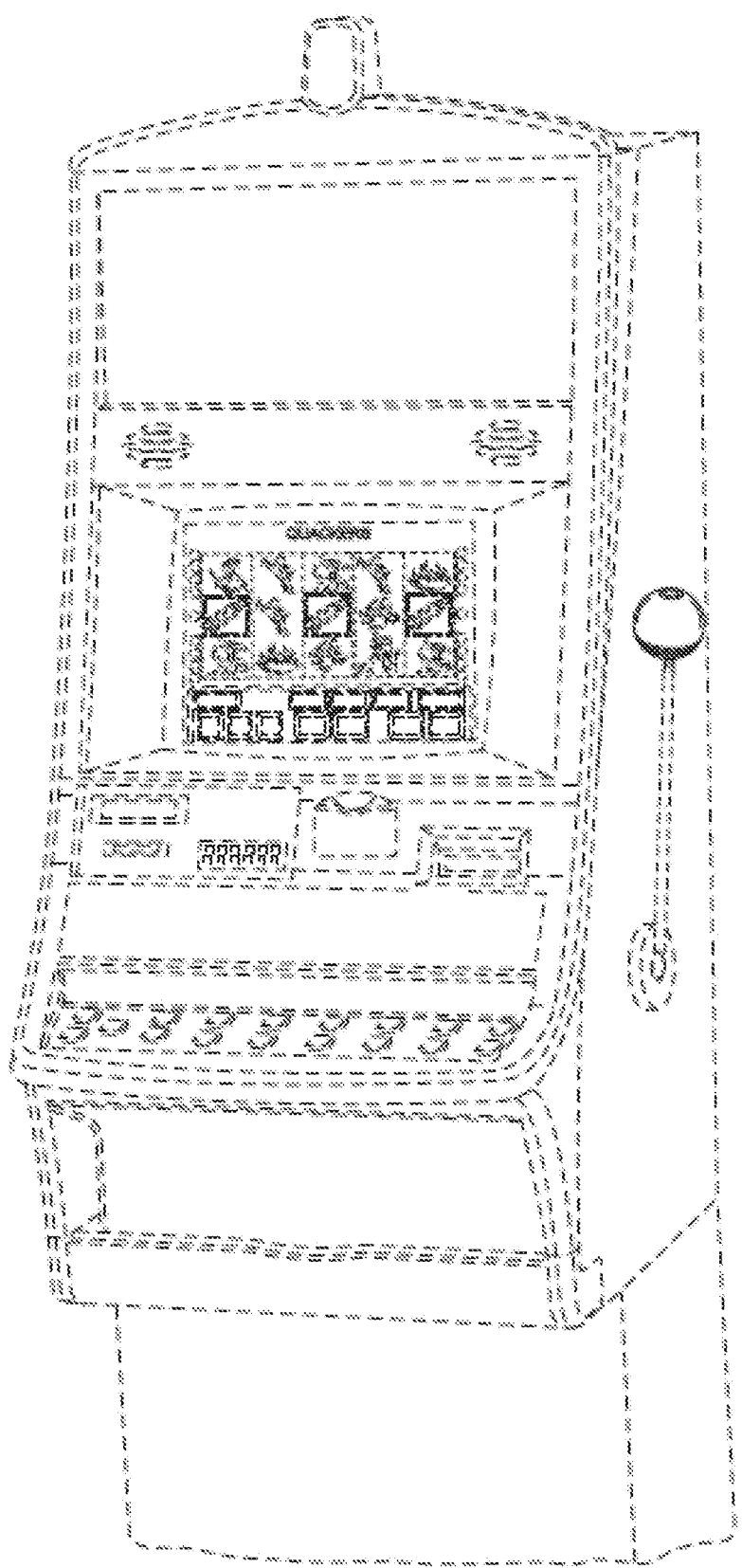
Figure 12G:
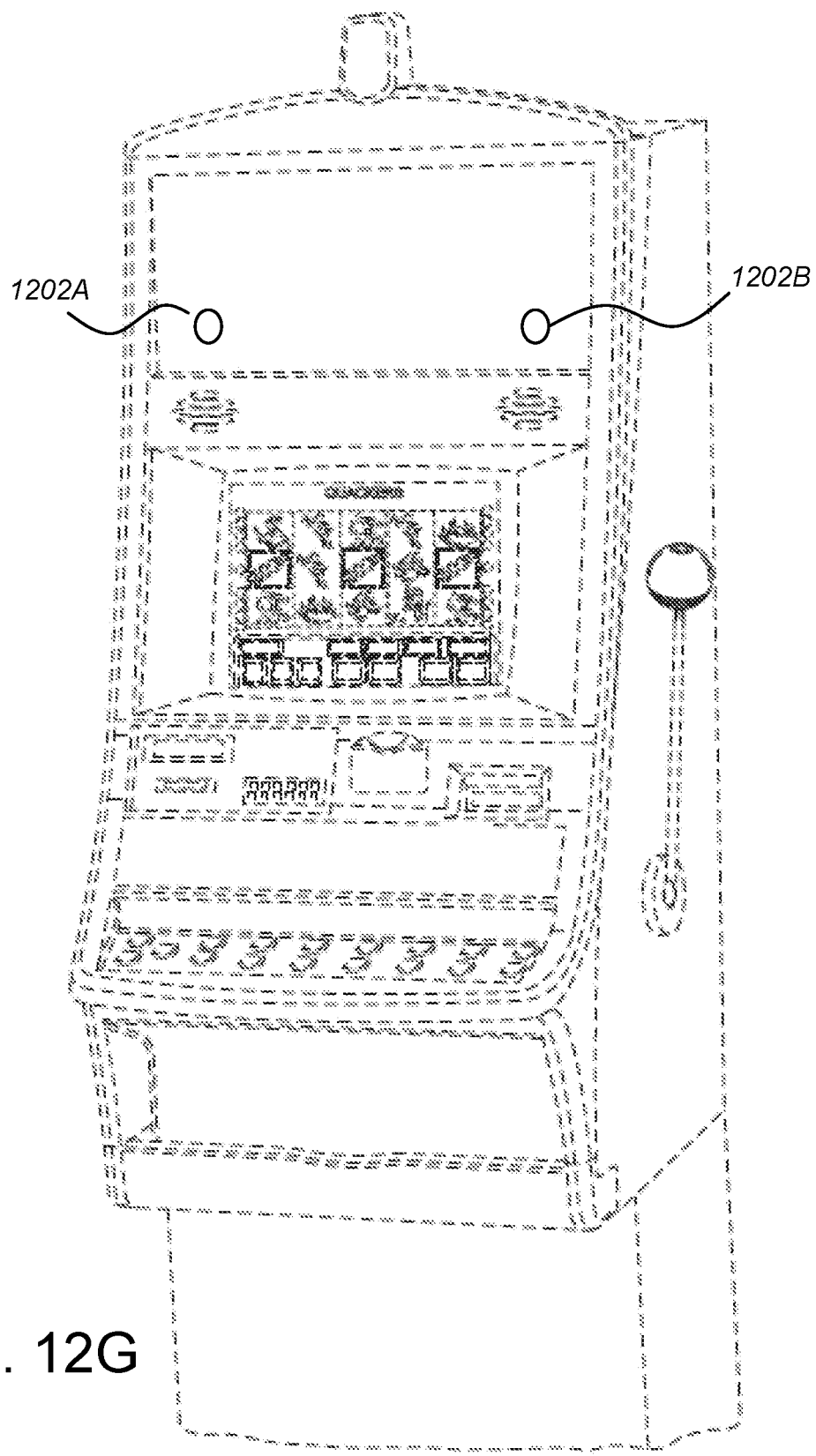

FIGS. 12A-12G are diagrams illustrating one embodiment of one or more biometric sensors. FIG. 12A is a top perspective view of the sensor device showing one embodiment of a biometric sensor for sensing and identifying biometric data, and FIGS. 12B, 12C, 12D, are front, top, and bottom views, respectively thereof. FIGS. 12E and 12F are diagrams illustrating uses of the biometric sensor in conjunction with a gaming machine. The rear, left and right views of the personal biometric identification sensor device are symmetrical and look identical to the front view depicted in FIG. 12B. This biometric sensor may be used to detect finger and/or palm prints, hand geometry, hand vascular patterns, or any combination thereof. Other biometric sensors may be integrated into sensor device illustrated in FIGS. 12A-12F. For example, the biometric sensor illustrated in FIGS. 12A-12F may also include an optical camera that can be used to form facial recognition in the visible and/or infrared wavelengths. The lens(es) of the optical camera(s) may be placed about the circumference of the sensor device at a location offering a good view of the user's face when the user approaches the gaming machine. Alternatively, or in addition to the foregoing, one r more optical cameras may be mounted on a peripheral surface (e.g. a side or top) of the gaming machine. In still another embodiment, one or more optical cameras (the use of more than one camera offering a stereoscopic view) may be mounted on a surface facing the user, as illustrated by the cameras 1202A and 1202B of FIG. 12G.

Further, the foregoing may be implemented with multiple biometric data. For example, in one embodiment, the first biometric data comprises a biometric of the user's index finger. Further first biometric data of the user's thumb may be collected by the biometric sensor. This further first biometric sensor data may be used as a backup should the initial first biometric sensor data be unusable to affirmatively identify the player, or the data may be used to improve the accuracy of affirmatively identifying the player. In this embodiment, the player may be prompted (e.g. by the gaming device) to place their index finger on the biometric sensor, then prompted to place their thumb on the biometric sensor to collect the biometric data. Or, the biometric sensor may simply take data from both the index finger and the thumb at the same time, and use the data separately.

Similarly, multiple biometric data may be used to encrypt the data before transmission. Hence, the first biometric data taken by the first biometric sensor as well as the cash out value may be encrypted according to second biometric data taken by the same biometric sensor or by a second biometric sensor at the gaming station. For example, the player may be prompted to place their left hand on the biometric sensor, read the biometric data from the player's left hand and combine this data (e.g. by concatenation or other means) with the cash out value. The user may then be directed to place their right hand on the biometric sensor, and this biometric data may be used to encrypt the combination of this biometric data and the cash out value before transmitting the data to another location. The embodiment has the advantage of making the first biometric data of the unreadable and unusable by anyone but the player, as the player's biometric data is required retrieve it. This embodiment is particularly useful in embodiments using fundamentally different biometric sensors and data. For example, the player's biometric data (arguably more private and difficult to obtain by illicit means) may be encrypted by facial recognition data (which is typically less private and easy to obtain). This protects the players more private biometric data by using biometric data that is somewhat less private (with some loss of security). This encryption can be implemented regardless of where the comparison of the biometric data is performed. For example, if the first biometric data and cash out value is transmitted to the second gaming station for comparison, this transmission may be encrypted as described above. Or, if the biometric data is transmitted to the first gaming station for comparison, this transmission may be encrypted and the cash out value may be transmitted to the second gaming station after being encrypted by either the or both sets of biometric data.

Finally, although the gaming stations 202 discussed in the foregoing disclosure comprise a gaming device such as a slot machine or blackjack machine, one or more of the gaming stations 202 may comprise a gaming table such as a roulette table, a blackjack table, or poker table. In this embodiment, when the user desires to cash out, they may inform the attendant or dealer at the gaming station 202 of that fact, whereupon the attendant enters the cash out amount and authorizes the user to use the biometric sensing device. Thereafter, the uses the biometric sensing device to cash out and may cash in at another gaming station as described above. This allows the user to continue to gamble at a gaming machine without having to cash in chips for cash or coin, or similar token usable by such gaming machine.

Similarly, the user may cash in to a gaming station having a roulette table, blackjack table or poker table. This can be accomplished by checking into the dealer or attendant, using the biometric device to identify the user, whereupon the dealer or attendant provides the user with the chips necessary to gamble at the new gaming station. Other embodiments are also possible, in which the user enters their chips into a device that evaluates them to determine their value instead of providing the chips to the dealer or attendant upon cash out, and in which the chips are provided to the user by a similar device upon cashing in to the new gaming station.

Essentially, these embodiments take the place of tokens conventionally used for this purpose (e.g. chips, printed bar codes and pre-printed tickets) and instead relies upon the user's biometrics for identification.

Figure 13A:
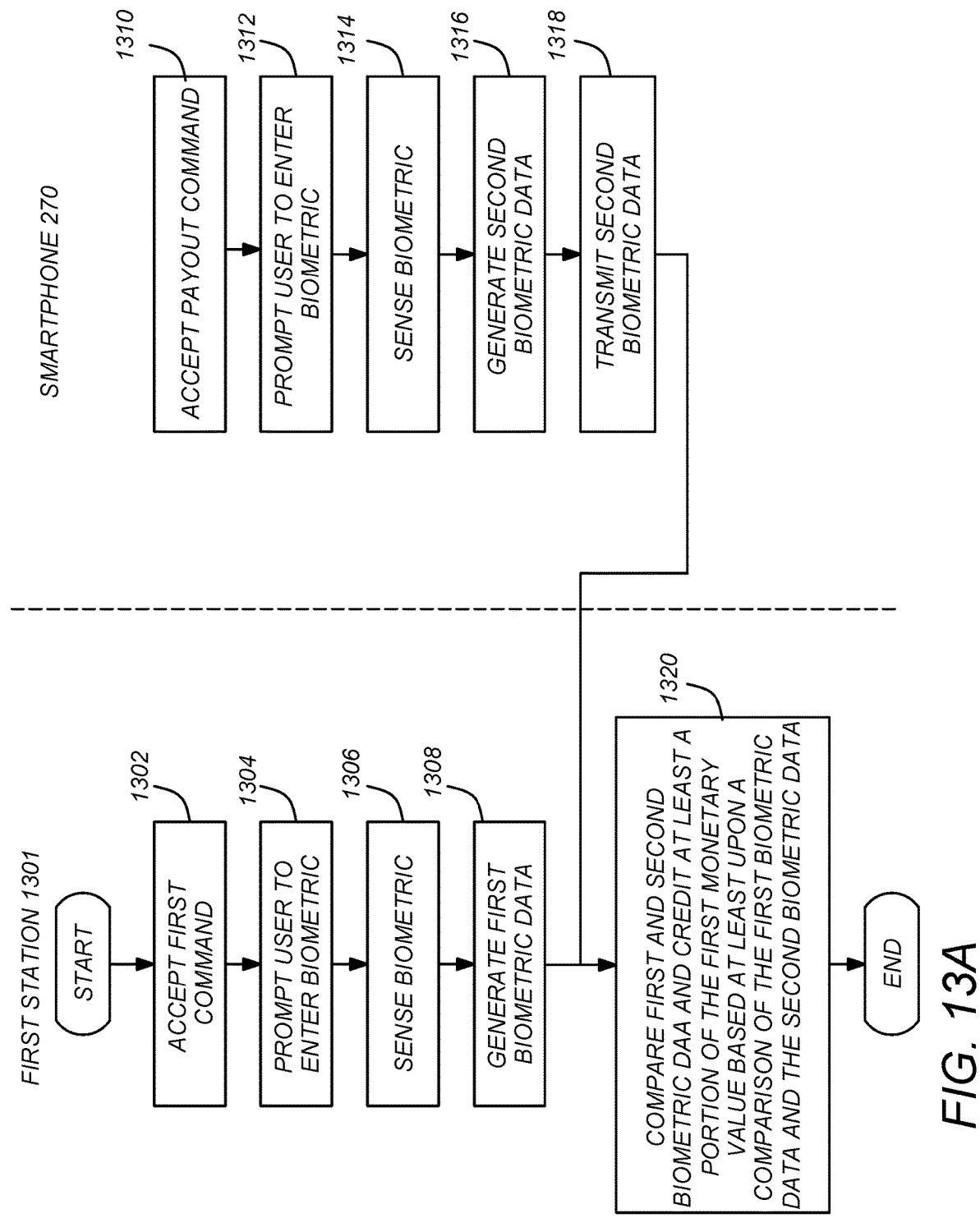
FIGS. 13A and 13B are a flow charts presenting illustrative examples of how a player may cash out of a station and apply a credit in the amount of the cash out value.
Figure 13B:
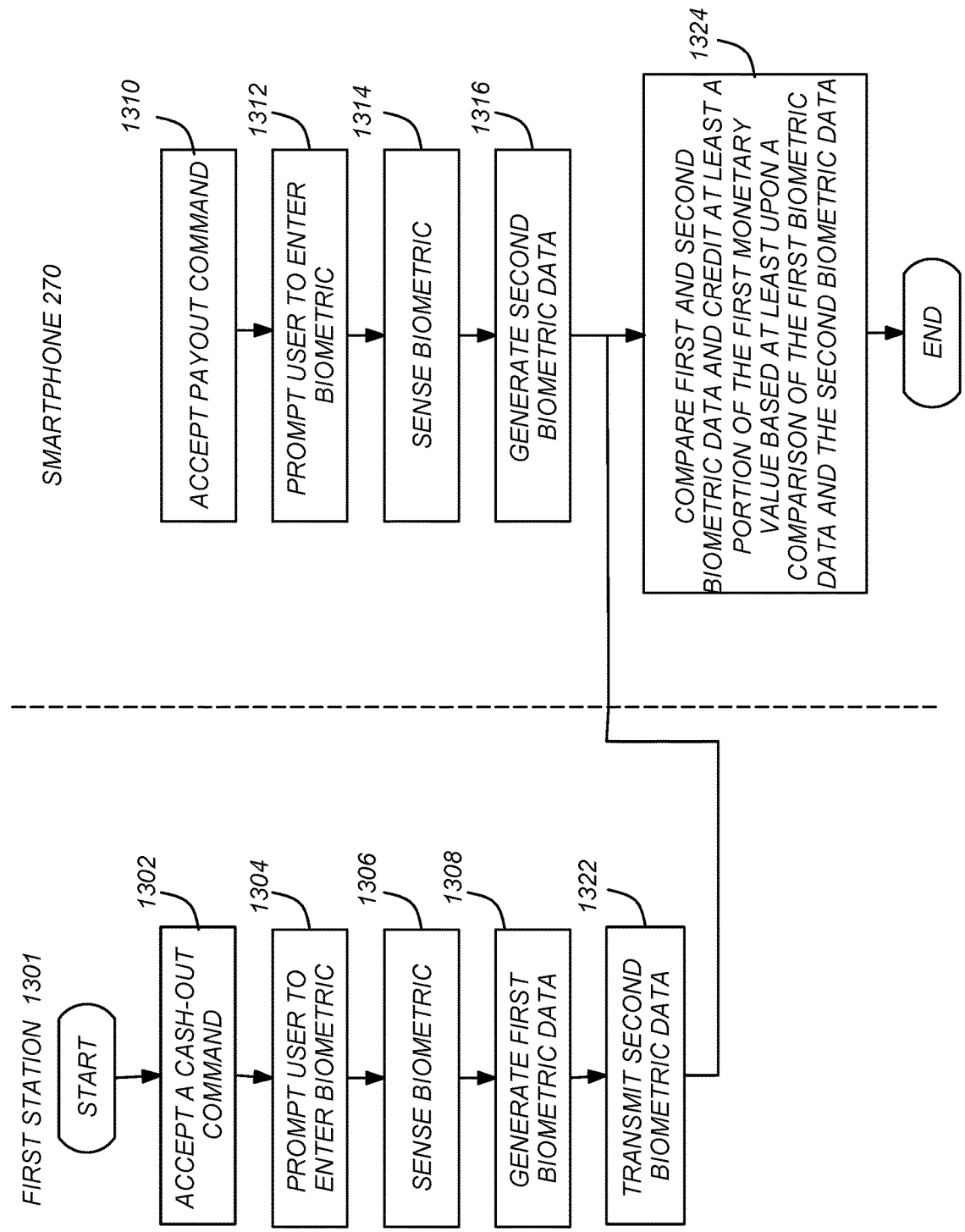

FIGS. 13A and 13B are a flow charts presenting illustrative examples of how a player 104 may use the GMPS 200 to cash out of a gaming device 204A and apply a credit in the amount of the cash out value. The comparison of the first biometric data obtained from the first station 1301 (which may comprise any of the gaming stations 202 or payout stations 212) and the second biometric data obtained from the smartphone 270 may be performed in the first station or the smartphone 270. Further, the applied credit may be provided by the station 1301 to the smartphone 270 for storage (where it may be used later at another station 1301) or directly to the user's account in the the financial institution 262 in the form of cryptocurrency or other token of monetary value.

In block 1302, the first station (which may comprise gaming station 202 or payout station 212) accepts a first (cash-out or payout) command from the player 104. This first command is typically provided using the user interface integrated with the gaming station 202 or payout station 212. As described above, the first command may be provided via an input device (such as input device 211A in the case of the gaming station 202 or input device 221A in the case of the payout station) having a biometric sensor 208, 218 wherein the biometric sensor 208, 218 concurrently senses the biometric of the person when accepting the first command. One example of such a biometric sensor 208 is an input device 211 having a surface that the person touches in order to provide the command, with an integrated biometric sensor disposed on the surface so that the biometric of the person (e.g. their fingerprint, vein print or similar) is sensed at the same time that the input is provided. This allows the person's biometric to be sensed while they provide an input in an ordinary way rather than requiring the user to provide the biometric in a separate step, and makes it more difficult to provide the input command without also providing the biometric. In one embodiment, use of the input device is the only means by which the person may enter the first command at the first station, thus mandating that the biometric be provided if the command is to be accepted at the first gaming station 202A. In one embodiment, the input device 211 is designed to provide no input command unless the biometric is successfully measured.

The biometric sensor 208A, 218A senses the biometric of the player 104, as shown in block 1306. First biometric data is generated from the biometric, as shown in block 1308. The first biometric data may be raw data (e.g. a bitmap of the player's biometric), or might comprise biometric metric data such as that which is used by law enforcement agencies to compare biometric data stored in databases. The translation of the biometric data from raw to processed data may also occur in the biometric sensor 208A, 218A itself (many commercially available devices perform such translations), by the processor 206A, 216A or may be shared between the biometric sensor 208A, 218A and the processor 206A, 216A.

The player 104 may then use a smartphone 270 to allow the monetary value to be credited to the player (for example, by crediting the player's account at the financial institution 262, another gaming station 202, another vending entity in the casino such as a restaurant, or even an entity outside the casino that has agreed to accept the credits). The player 104 provides a command such as a payout to the smartphone 270, as shown in block 1310, indicating that the user would like to use the smartphone 270 to transfer credits of monetary value. This may be accomplished using the user interface included with the smartphone 270, such as the touch screen display 272 or any physical buttons or controls.

The smartphone 270 may prompt the player 104 to enter his/her biometric by placing the same source of the biometric (e.g. the same finger) on the cellphone's biometric sensor 274, as shown in block 1312, or the player 104 may simply enter their biometric, for example, by placing his/her finger on the biometric sensor 274 to start the process, in which case, the entry of the payout command and user prompting are unnecessary.

The smartphone 270 then senses the player's biometric and generates second biometric data from the sensed biometric, as shown in blocks 1314 and 1316. The biometric data is then transmitted from the smartphone 270 to the first station 1301 for comparison as shown in block 1318. This transmission can be accomplished via an Internet protocol using WiFi or a cellular network, Bluetooth or other means.

Block 1320 performs the comparison, and credits at least a portion of the first monetary value present at the first station 1301 when the first command was accepted. The credit may be applied by the first station 1301 interfacing with the financial institution 262 to provide the credit directly to an account of the user at the financial institution 262, to the smartphone 270, or to the financial institution 262 via the smartphone. This can be accomplished via the transmission of a cryptocurrency such as BitCoin or through analogous means.

FIG. 13B is a diagram illustrating another example of how a player 104 may use the GMPS 200 to cash out of a gaming device 204A and apply a credit in the amount of the cash out value. In this example, the comparison of the first biometric data obtained from the first station 1301 and the second biometric data obtained from the smartphone 270 is performed in the smartphone 270. In this embodiment, the operations are identical, except the first station transmits 1301 the first biometric data to the smartphone 270 in block 1322, and the smartphone 270 compares the first and second biometric data and applies the credit, as shown in block 1324. In one embodiment, the smartphone 270 requests that the first station 1301 transmit the data after receiving the payout command 1310.

In other embodiments, the smartphone 270 transmits the request for biometric data after generating the second biometric data. The request for the biometric data may comprise an identifier of the first station 1301 or may comprise the second biometric data itself. In this case, the stations 1301 can receive the second biometric data, compare this received second biometric data to any stored biometric data, and respond with the first biometric data if the first and second biometric data sufficiently match.

Alternatively, the application executed by the smartphone 270 may present an interface wherein the user is presented with a plurality of gaming stations 202 and/or payout stations 212A, and the user selects an identifier associated with the gaming station 202 or payout station 212. Or, in another embodiment, when the user cashes out of the first station 1301, an interface is presented on the first station 1301 allowing the user to select a smartphone 270 that they would like to be used to enter the second biometric, and if the credit is to be applied via the smartphone 270, which smartphone 270 it is to be applied to.

Other data may be used to determine whether to pay out the payout value. For example, the player 104 may be prompted to enter a password when cashing out of the first station 1301, and prompted for that same password when attempting to collect the payout from the smartphone 270.

Figure 14:
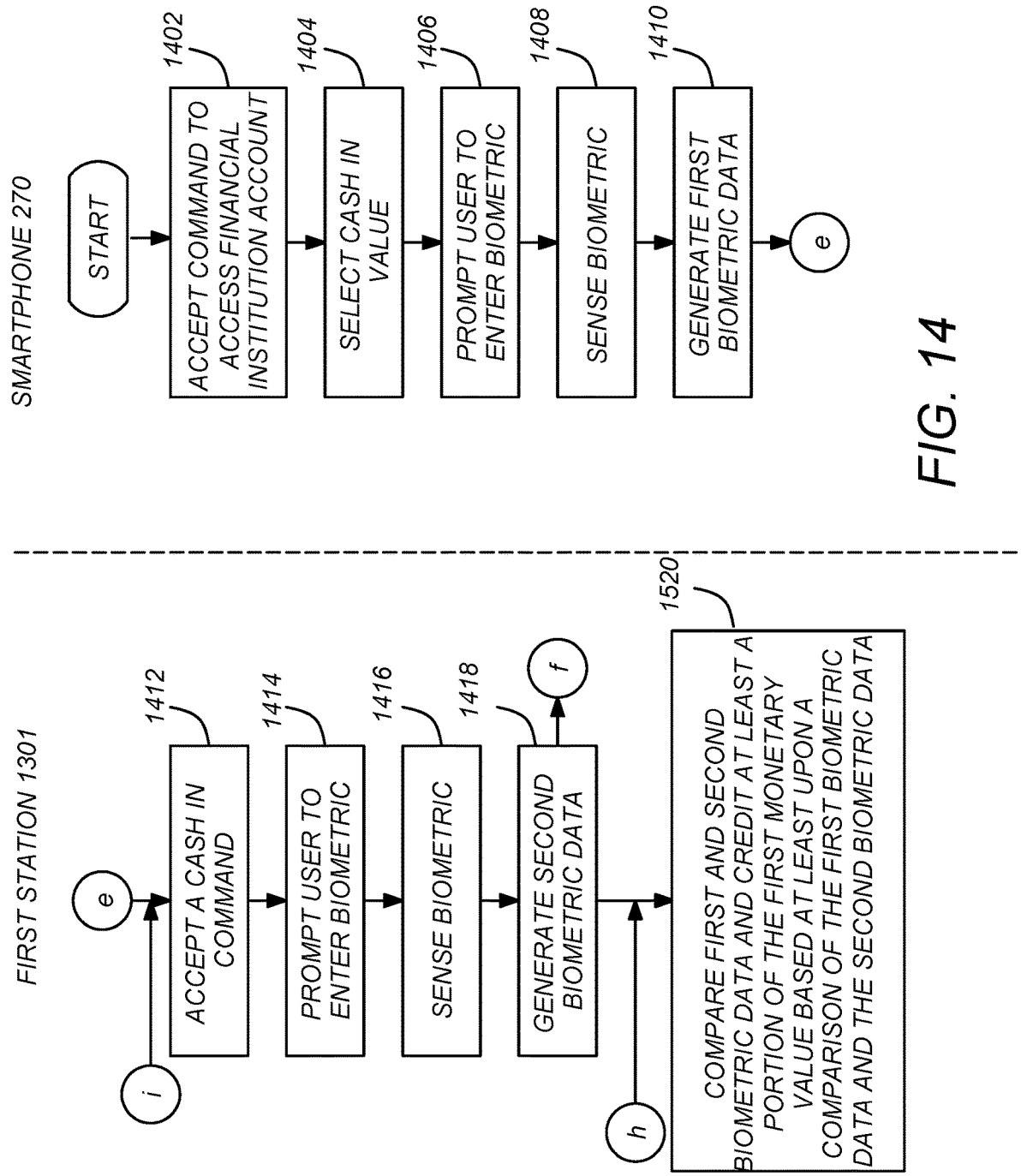
FIG. 14 is a diagram illustrating how the smartphone may be used to cash into a gaming station or apply credit to a transaction station.

FIG. 14 is a diagram illustrating how the smartphone 270 may be used to cash into a gaming station 202 or apply credit to a transaction station 212.

The player 104 uses the smartphone 270 executing a to issue a command to access their account in a financial institution 262. Typically, this involves using a smartphone 270 application that can be used to perform banking with the financial institution using the smartphone 270. The player 104 then selects a desired cash-in value, as shown in block 1404. In one embodiment, the user may also indicate which gaming station 202A the user would like to play or transaction station 212 they would like to use to apply credits, as indicated by an application executing on the smartphone 270 communicating with the casino network 260. The smartphone 270 may then reserve that gaming station (e.g. by disabling that gaming station 202 from play for any other person). The smartphone 270 prompts the user to enter their biometric as shown in block 1406, senses the biometric as shown in block 1408, and generates first biometric data as shown in block 1410.

If the player 104 was not located in the vicinity of the first station 1301, the player moves to the first station 1301 and provides a cash-in command which the gaming station 202A accepts, as shown in block 1412. The gaming station prompts the user to enter their biometric, as shown in block 1414, senses the provided biometric as shown in block 1416, and generates second biometric data, as shown in block 1418. The first station 1301 then compares the first and second biometric data, and if the first and second biometric data sufficiently match, a credit is applied (e.g. to the gaming station 202 or the transaction station 212 in the amount of the cash-in value.

In the foregoing embodiment, the comparison of the first and second biometric data is performed by the first station 1301 using biometric data generated at the first station 1301 and received from the smartphone 270. Other embodiments are possible. For example, the process may begin at the first station 1301, with the user entering a cash-in command and a cash-in amount. The user may provide a biometric that is sensed, and the resulting biometric data stored. The first station may then ask the user to provide the cash in value, and ask the user to identify a smartphone from which the required cash-in value will be obtained. Once identified, the first station 1301 may establish a secure session with the smartphone 270. The user then performs steps 1402 and 1410 to select the cash in value and generate biometric data associated with the user. This biometric data is then compared to the first biometric data in block 1420, and depending upon the result, the cash-in value is credited to the transaction station 212 for the user of to the gaming device 202 that the user wishes to play.

The foregoing system may also be used to track the persons 104 as they use their biometrics within the system 200. In this embodiment, the person is associated with the locations of each of the biometric sensors 208, 218 that they use. For example, when the person uses the first biometric sensor 208A to generate first biometric sensor data (e.g. when cashing out of a first gaming device 202B) at a particular time, the time the biometric was sensed is associated with that first biometric sensor data and used to indicate that the person associated with that biometric data was at the first gaming station 202A at that particular time. When the person uses the second biometric sensor 208B to generate the second biometric sensor data at a second particular time, the second biometric sensor data is checked to determine if it matches any other biometric sensor data taken at earlier times. If a match is found, the second biometric sensor data is associated with the same person and used to indicate that the person associated with that second biometric sensor data was at the second station at the second time.

Figure 15:
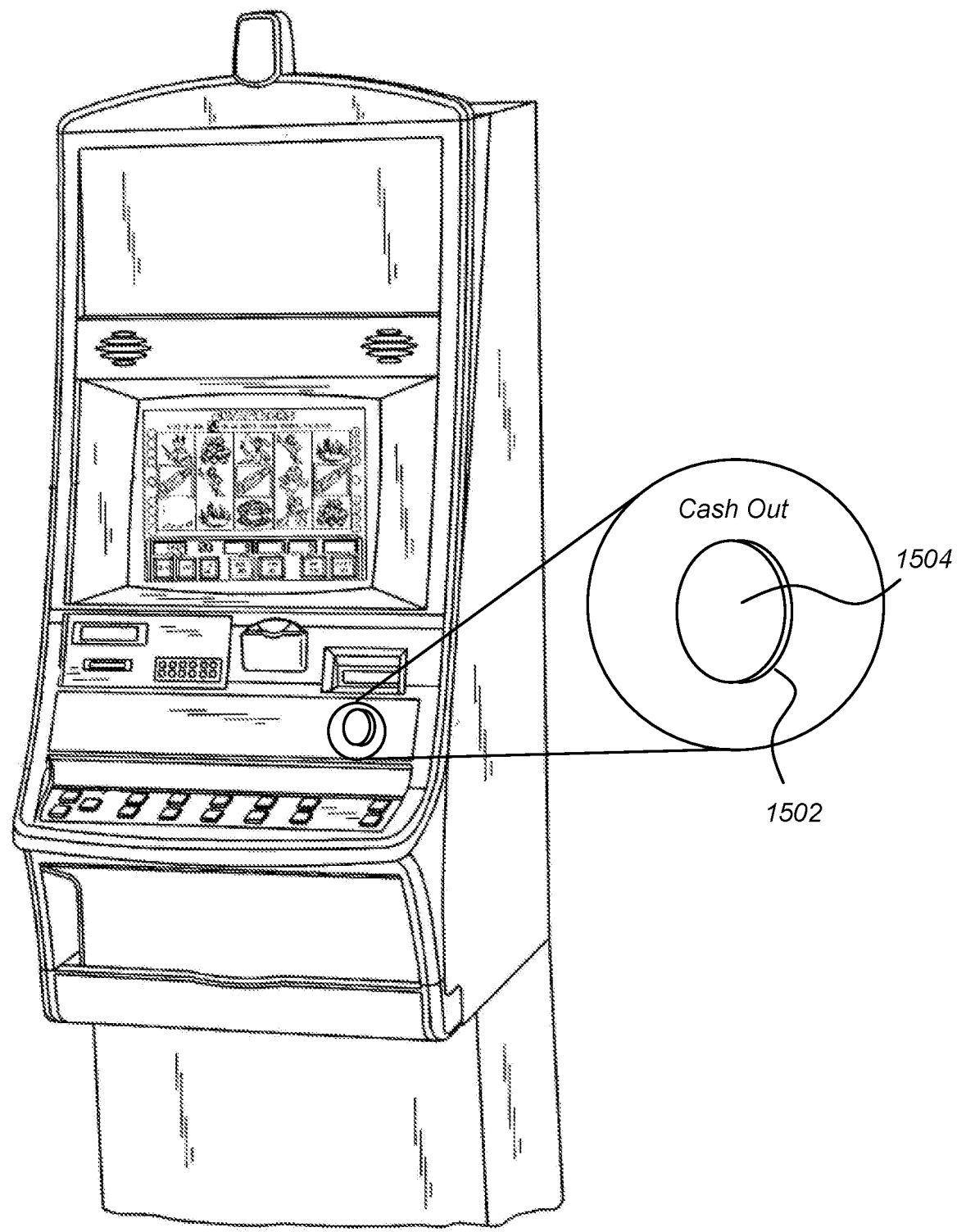
FIG. 15 is a diagram illustrating one embodiment of an input device having an integrated biometric sensor in a gaming machine application.

FIG. 15 is a diagram illustrating one embodiment of an input device having an integrated biometric sensor in a gaming machine application. In this embodiment, the input device 1502 comprises a switch 1502 for accepting a cash out command from the user. The switch may be a mechanical, capacitive, or any means for providing converting the physical touch or motion of an appendage of the person on the input device to signal a state change such as a change in conductivity between input device terminals. At least a portion of an external surface of the input device 1502 comprises a biometric sensor 1504 for sensing the biometric of the player when the player uses the input device (e.g. by touching or depressing the input device). In one embodiment, for example, the biometric sensor 1504 is comprises a fingerprint sensor having a biometric sensitive surface that contacts and measures the biometric of the player. Other embodiments are also possible. For example, the input device 1504 may comprise a vein sensor integrated with the switch, that measures the vein pattern of the user when operating the switch. In another example, the switch integrated with a camera that measures facial features of the player when using the switch. The biometric sensor may use multiple sensing modalities (for example, taking measurements at multiple different wavelengths).

Figure 16:
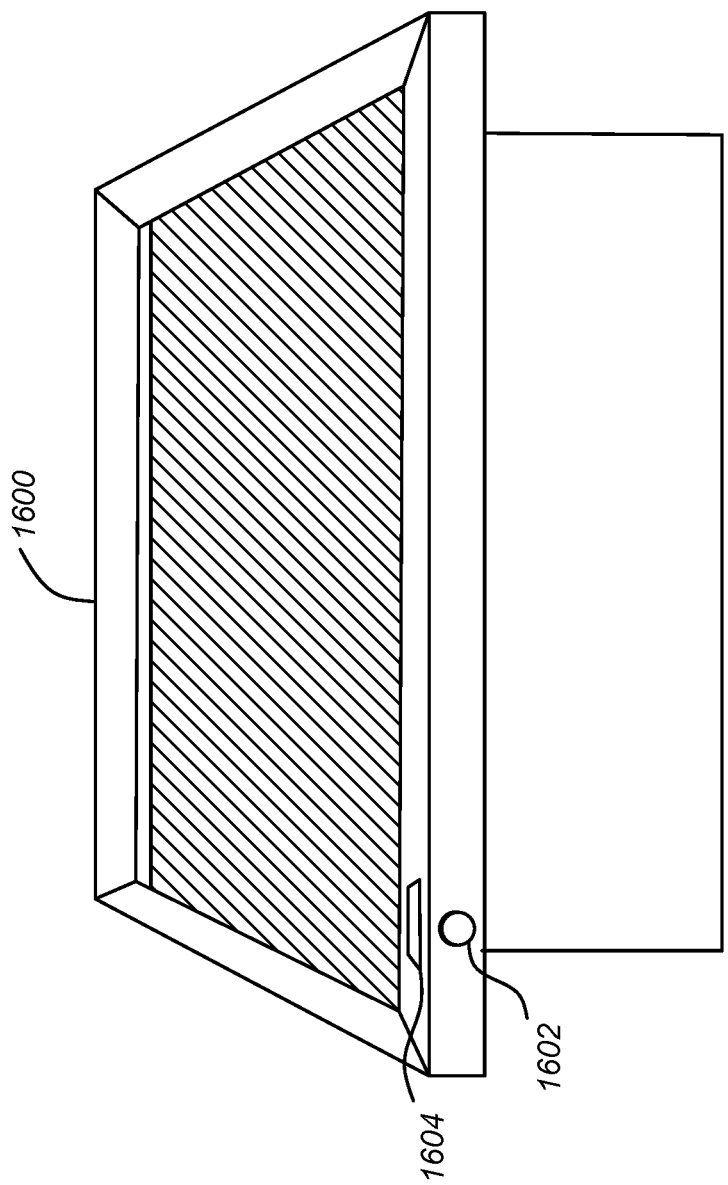
FIG. 16 is a diagram of an embodiment of the input device on a gaming table.

FIG. 16 is a diagram of an embodiment of the input device on a gaming table. Similar to the embodiment shown in FIG. 15, the input device 1602 may include a switch and an integrated biometric sensor such as a fingerprint sensor.

In the embodiment shown in FIG. 15, the display and other I/O devices of the gaming machine can be used to alert the player to provide the biometric, or to apply it additional times in order to make good measurements. These I/O devices can also be used to provide detailed instructions. Since gaming tables typically do not include such I/O devices, a user interface 1604 may be included in this embodiment. The user interface 1604 can be used to provide instructions to the player to provide their biometric, confirm the location that they last provided their biometric, and may also provide other information. This relieves the attendant or croupier at the gaming table from needing to instruct players how to cash in to the gaming table.

This embodiment may also include a user interface for the attendant or croupier to indicate that a person has cashed in and to provide the player with chips or other medium used in playing the table game. When the person cashes out, they can provide their chips to the attendant, croupier or dealer, and the attendant (using their interface), may enable the input sensor to alert the player to scan their biometric so that the cash out value can be associated with their biometric, at which time, the player may leave and use their biometric to cash in elsewhere.

Figure 17:
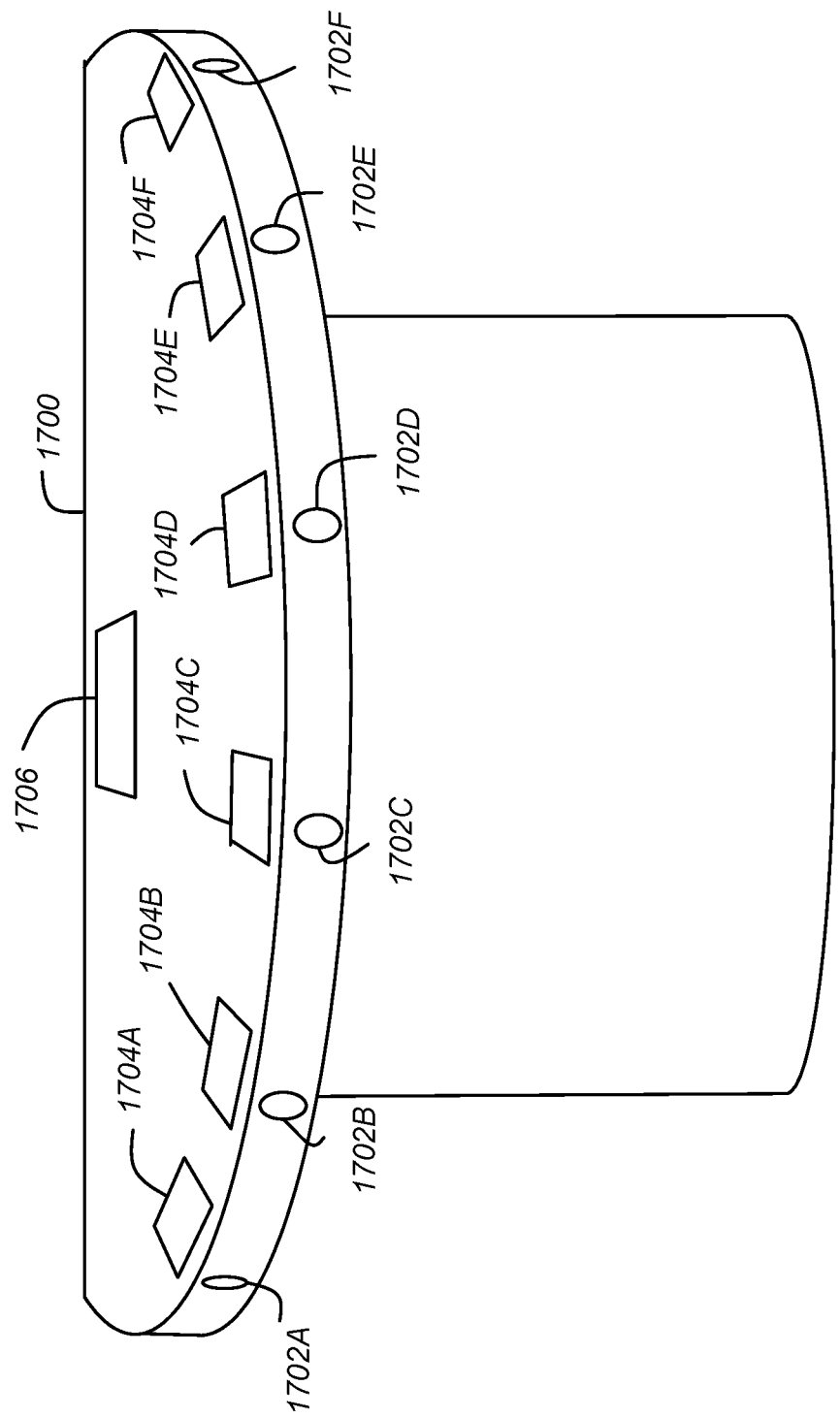
FIG. 17 is a diagram of an embodiment of a gaming table having a plurality of input devices.

FIG. 17 is a diagram of an embodiment of a gaming table having a plurality of input devices. This embodiment is useful, for example, in a table game such as blackjack, where a plurality of players may be seated at the table, each at a particular station or location. As illustrated, the gaming table 1700 has six stations, each with an associated input device 1702A-1702F, and an associated user interface 1704A-1704F such as a display, that provides the player instructions on how to cash in and cash out using their biometric. The user interface 1704A-1704F may be a touch screen display, thus providing the user the ability both receive visual (and aural) input and prompts and to provide input. The gaming table 1700 may also comprise a user interface 1706 provided to the dealer. User interface 1706 can be used to alert the dealer to the fact that another user has cashed in (thus alerting the dealer to provide the new player chips), that another user is attempting to cash in or out (thus allowing the dealer to assist the user if necessary), and can also provide the dealer with other information or alerts.

Figure 18:
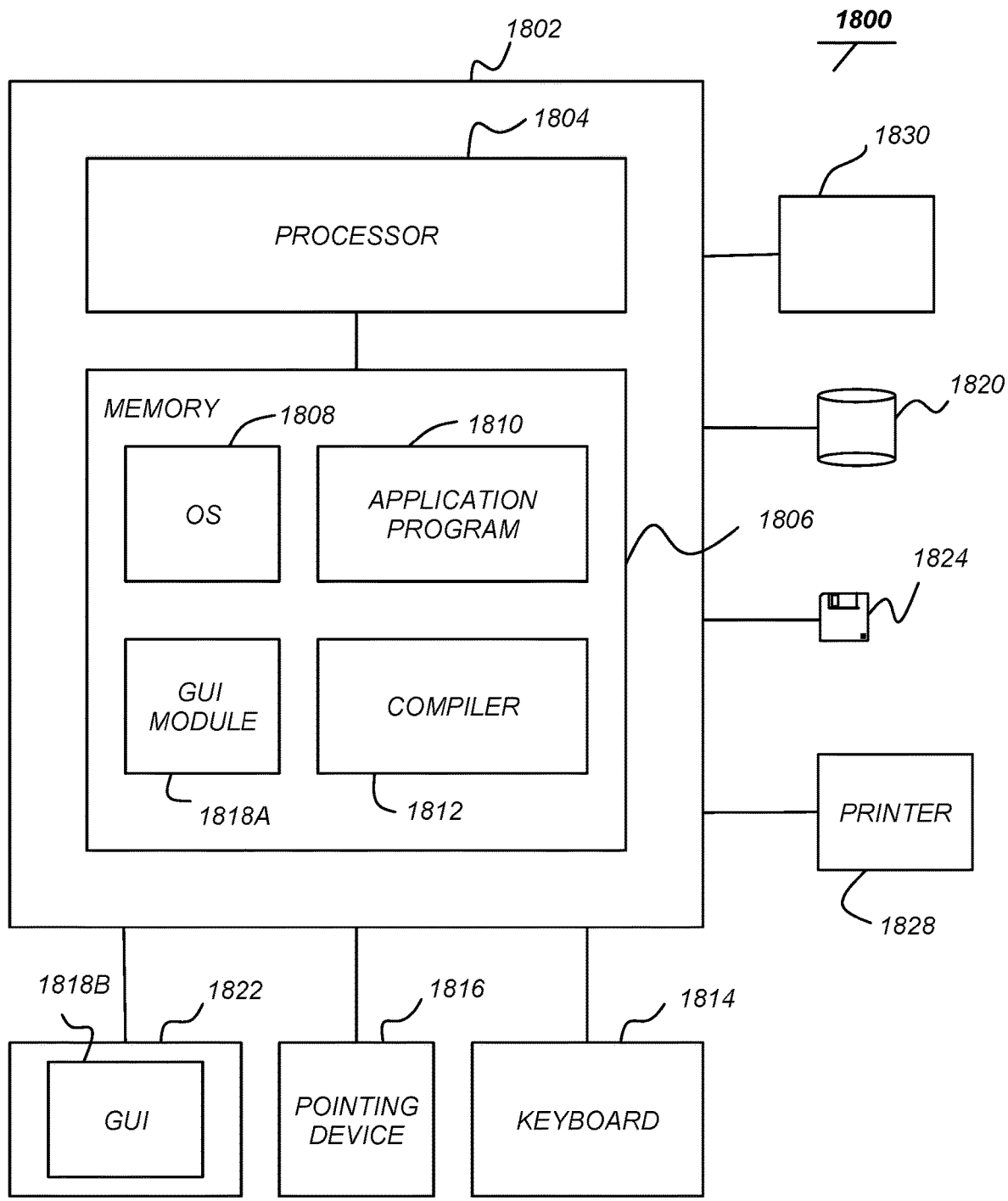
FIG. 18 illustrates an exemplary computer system that could be used to implement the processors in the gaming stations or payout stations.

FIG. 18 illustrates an exemplary computer system 1800 that could be used to implement the computer system or processors 206, 216. The computer 1802 comprises a computer processor 1804 and a memory, such as random-access memory (RAM) 1806. The computer 1802 is operatively coupled to a user interface 210, 220 which may include a display 1822, which presents images such as windows to the user on a graphical user interface 1818B and other devices, such as a keyboard 1814, a mouse device 1816, a printer 1828, etc. Of course, those skilled in the art will recognize that any combination of the above components, or any number of different components, peripherals, and other devices, may be used with the computer 1802. The computer 1802 may be communicatively coupled to other computers in a network via network interface 1830.

Generally, the computer 1802 operates under control of an operating system 1808 stored in the memory 1806, and interfaces with the user to accept inputs and commands and to present results through a graphical user interface (GUI) module 1818A. Although the GUI module 1818A is depicted as a separate module, the instructions performing the GUI functions can be resident or distributed in the operating system 1808, the application program 1810, or implemented with special purpose memory and processors. The computer 1802 also implements a compiler 1812 which allows an application program 1810 written in a programming language such as COBOL, C++, FORTRAN, or other language to be translated into processor 1804 readable code. After completion, the application 1810 accesses and manipulates data stored in the memory 1806 of the computer 1802 using the relationships and logic that was generated using the compiler 1812.

In one embodiment, instructions implementing the operating system 1808, the computer program 1810, and the compiler 1812 are tangibly embodied in a computer-readable medium, e.g., data storage device 1820, which could include one or more fixed or removable data storage devices, such as a zip drive, floppy disc drive 1824, hard drive, CD-ROM drive, tape drive, etc. Further, the operating system 1808 and the computer program 1810 are comprised of instructions which, when read and executed by the computer 1802, causes the computer 1802 to perform the steps necessary to implement and/or use the present invention. Computer program 1810 and/or operating instructions may also be tangibly embodied in memory 1806 and/or data communications devices, thereby making a computer program product or article of manufacture according to the invention. As such, the terms "article of manufacture," "program storage device," and "computer program product" as used herein are intended to encompass a computer program accessible from any computer readable device or media.

Any combination of the above components, or any number of different components, peripherals, and other devices, may be used with the present invention.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, while the foregoing is discussed in terms of crediting amounts from a RTD to a gaming station, credit may also be applied to other locations if desired, including vending machines, a saloon, or other establishment coupled to the GMPS 200.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transferring monetary value in a system comprising a first station and a second station, the method comprising:
   accepting a first command in a first station, the first command associated with a first monetary value;
   in response to the first command:
      sensing a fingerprint of a person with a first fingerprint sensor at the first station;

generating first fingerprint data from the fingerprint sensed by the first fingerprint sensor;

storing the generated first fingerprint data in the system for later comparing with second fingerprint data to be taken at a second station;

accepting a second command at a second station comprising a second fingerprint sensor;

in response to the second command:

sensing the fingerprint of the same person with the second fingerprint sensor;

generating the second fingerprint data from the fingerprint sensed by the second fingerprint sensor;

encrypting the second fingerprint data according to the second fingerprint data;

decrypting, at the first station, the encrypted second fingerprint data according to the first fingerprint data;

comparing, at the first station, the stored first fingerprint data with the second fingerprint data;

determining from the comparing that the first fingerprint data and the second fingerprint data are from the same person;

crediting the second station the first monetary value based at least in part upon the determination that the first fingerprint data and the second fingerprint data are from the same person, comprising:

transmitting a message from the first station to the second station, the message commanding the crediting of the first monetary value at the second station; and deleting the stored first fingerprint data from the system after crediting the second station with the first monetary value, wherein the first fingerprint data and the second fingerprint data are stored only until the first monetary value is credited and deleted thereafter;

wherein the first station and the second station together define a gaming system, and the first fingerprint data and the second fingerprint data are not transmitted external to the gaming system.

2. The method of claim 1, wherein the second fingerprint data is wirelessly transmitted to the first station via a communications link.

3. The method of claim 2, wherein: the first fingerprint data and the first monetary value is encrypted by the first fingerprint data before transmission to the second station.

4. A system for transferring monetary value, comprising:
a first station, having:
  a first input device having a first fingerprint sensor, for accepting a first command in the first station while concurrently sensing a fingerprint of a person;
  a first processor, communicatively coupled to the first input device and a memory storing first processor instructions comprising first processor instructions for:
    accepting the first command in the first station, the first command associated with a first monetary value; and
    generating first fingerprint data from the fingerprint sensed by the first fingerprint sensor in response to the first command;
a second station comprising:
a second input device;
a second fingerprint sensor for sensing the fingerprint of the same person;
a second processor, communicatively coupled to the second input device and the second fingerprint sensor and a memory storing second processor instructions, the second processor instructions comprising second processor instructions for:
  accepting a second command from the second input device; and
  generating second fingerprint data from the fingerprint sensed by the second fingerprint sensor;
wherein;
the first fingerprint data is stored in the system in response to the first command for later comparing with the second fingerprint data taken at the second station;
the first fingerprint data is compared with the second fingerprint data after the second command is accepted in the second station to determine if the first fingerprint data and the second fingerprint data are from the same person; and
one of the first station and the second station compares the first fingerprint data and the second fingerprint data;
one of the first station and the second station credits the person with the first monetary value based at least in part upon the comparing of the first fingerprint data and the second fingerprint data; and
the stored first fingerprint data is deleted from the system after crediting the person with the first monetary value, wherein the first fingerprint data and the second fingerprint data are stored only until the first monetary value is credited and deleted thereafter; and
wherein the first station and the second station together define a gaming system and the first fingerprint data and the second fingerprint data are not transmitted external to the gaming system.

5. The system of claim 4, wherein:
the second station comprises a wireless transmitter for transmitting the second fingerprint data to the first station;
the first processor instructions further comprise instructions for:
  comparing the first fingerprint data and the second fingerprint data; and
  crediting the first monetary value based at least in part upon the comparing of first fingerprint data and the second fingerprint data.

6. The system of claim 5, wherein:
the first station is comprises a gaming station;
the second station is comprises a legacy automated teller machine (ATM) modified to operate with the second fingerprint sensor and the first gaming station, the ATM communicatively coupled to a financial institution and used to complete financial transactions of a financial institution account of the person; and
the first monetary value is credited to a financial account of the person.

7. The system of claim 4, wherein:
the second station comprises a wireless receiver for receiving the first fingerprint data from the first station;
the second processor instructions further comprise instructions for:
  comparing the first fingerprint data and the second fingerprint data; and
  crediting of the first monetary value based at least in part upon the comparing of first fingerprint data and the second fingerprint data.

8. The method of claim 1, wherein:
the first station is comprises a gaming station; and
the second station is comprises a check cashing machine modified to operate with the second fingerprint sensor and the first gaming station.

9. The method of claim 1, wherein:
the first station comprises a gaming station; and
the second station is comprises a legacy automated teller machine (ATM) modified to operate with the second fingerprint sensor and the first gaming station, the ATM communicatively coupled to a financial institution and used to complete financial transactions of a financial institution account of the person.

10. The method of claim 9, wherein the ATM credits the person's financial institution account with the first monetary value.

11. The system of claim 4, wherein:
the first processor instructions further comprise instructions for encrypting the first fingerprint data and the first monetary value according to the first fingerprint data; and
the second processor instructions further comprise instructions for decrypting the encrypted first fingerprint data and the monetary value according to the second fingerprint data.

* * * * *